United States Patent
Ishikawa et al.

(10) Patent No.: US 9,649,839 B2
(45) Date of Patent: May 16, 2017

(54) IMAGE PROCESSING APPARATUS AND IMAGE PROCESSING METHOD

(71) Applicant: CANON KABUSHIKI KAISHA, Tokyo (JP)

(72) Inventors: Tomokazu Ishikawa, Yokohama (JP); Shinjiro Hori, Yokohama (JP); Tetsuya Suwa, Yokohama (JP); Hidetsugu Kagawa, Kawasaki (JP); Yumi Yanai, Yokohama (JP); Wakako Tanaka, Inagi (JP); Tohru Ikeda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/192,243

(22) Filed: Jun. 24, 2016

(65) Prior Publication Data

US 2017/0001432 A1    Jan. 5, 2017

(30) Foreign Application Priority Data

Jul. 1, 2015    (JP) .................................. 2015-132856

(51) Int. Cl.
*B41J 2/045*    (2006.01)
*G06K 9/46*    (2006.01)
(Continued)

(52) U.S. Cl.
CPC ......... *B41J 2/0451* (2013.01); *B41J 2/04586* (2013.01); *G06K 9/38* (2013.01);
(Continued)

(58) Field of Classification Search
CPC ...... B41J 2/2142; B41J 2/2146; B41J 2/0451; B41J 2/04586; G06K 9/38; G06K 9/46;
(Continued)

(56) References Cited

U.S. PATENT DOCUMENTS 5,450,165 A    9/1995    Henderson
8,503,031 B2    8/2013    Kajihara
(Continued)

FOREIGN PATENT DOCUMENTS

EP    0 872 810    10/1998
JP    2010-111031    5/2010
JP    2013-185862    9/2013

OTHER PUBLICATIONS

U.S. Appl. No. 15/191,226, filed Jun. 23, 2016.
(Continued)

*Primary Examiner* — Thinh H Nguyen
(74) *Attorney, Agent, or Firm* — Fitzpatrick, Cella, Harper & Scinto

(57) ABSTRACT

An image processing apparatus has: a generating unit configured to generate inspection target image data on the basis of read image data; a setting unit configured to set inspection target areas from the inspection target image data; and an extracting unit configured to extract a unique portion by applying a predetermined process to the set inspection target areas. The setting unit sets the inspection target areas so as to make the ratio of inspection target areas to the entire image area of the inspection target image data in a predetermined direction larger than the ratio of inspection target areas to the entire image area in a direction intersecting with the predetermined direction.

20 Claims, 27 Drawing Sheets

(51) Int. Cl.
*G06K 15/10* (2006.01)
*G06K 9/38* (2006.01)
*H04N 1/00* (2006.01)

(52) U.S. Cl.
CPC .............. *G06K 9/46* (2013.01); *G06K 15/102* (2013.01); *H04N 1/00795* (2013.01); *H04N 2201/0094* (2013.01)

(58) Field of Classification Search
CPC .............. G06K 15/102; H04N 1/00795; H04N 2201/0094; H04N 1/405
See application file for complete search history.

(56) References Cited

U.S. PATENT DOCUMENTS

| | | |
|---|---|---|
| 8,619,319 B2 | 12/2013 | Tsuchiya |
| 8,830,530 B2 | 9/2014 | Sano |
| 8,979,238 B2 * | 3/2015 | Nishikori ............... B41J 2/2146 347/14 |
| 9,064,202 B2 | 6/2015 | Tanaka |
| 9,087,291 B2 | 7/2015 | Hori |
| 9,092,720 B2 | 7/2015 | Nakagawa |
| 9,210,292 B2 | 12/2015 | Miyake |
| 2003/0133606 A1 | 7/2003 | Yano |
| 2010/0251915 A1 | 10/2010 | Kasai et al. |
| 2011/0149331 A1 | 6/2011 | Duggan et al. |
| 2016/0167414 A1 | 6/2016 | Yanai |
| 2016/0167415 A1 | 6/2016 | Ikeda |
| 2016/0173725 A1 | 6/2016 | Kato |

OTHER PUBLICATIONS

U.S. Appl. No. 14/991,618, filed Jan. 8, 2016.
U.S. Appl. No. 15/192,216, filed Jun. 24, 2016.
U.S. Appl. No. 15/192,229, filed Jun. 24, 2016.
U.S. Appl. No. 15/191,210, filed Jun. 23, 2016.
U.S. Appl. No. 15/191,241, filed Jun. 23, 2016.
Kizuki, "Algorithm inspired by Peripheral Vision and Involuntary Eye Shift", Journal of the Japan Society for Precision Engineering, vol. 79, No. 11, 2013, p. 1045-1049.
Aoki et al., "'KIZUKI' Processing for Visual Inspection: A Smart Pattern Pop-Out Algorithm Based on Human Visual Architecture," pp. 2317-2322, Aug. 24, 2014, International Conference on Pattern Recognition, IEEE Computer Society.
European Search Report dated Nov. 15, 2016 issued in corresponding European Patent Application No. 16001433.

* cited by examiner

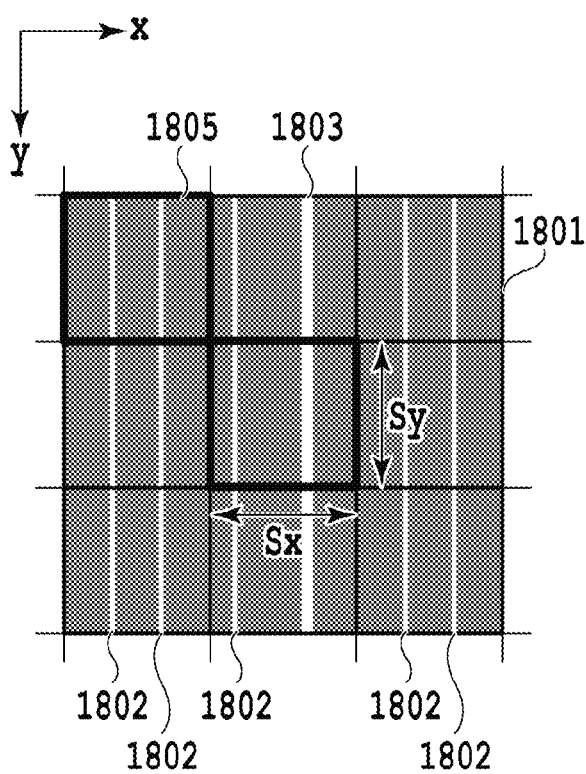
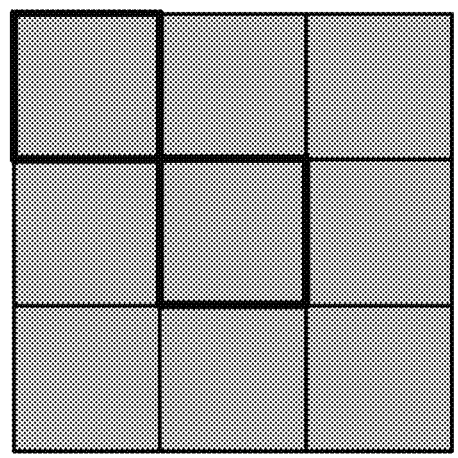
FIG.10A  FIG.10B
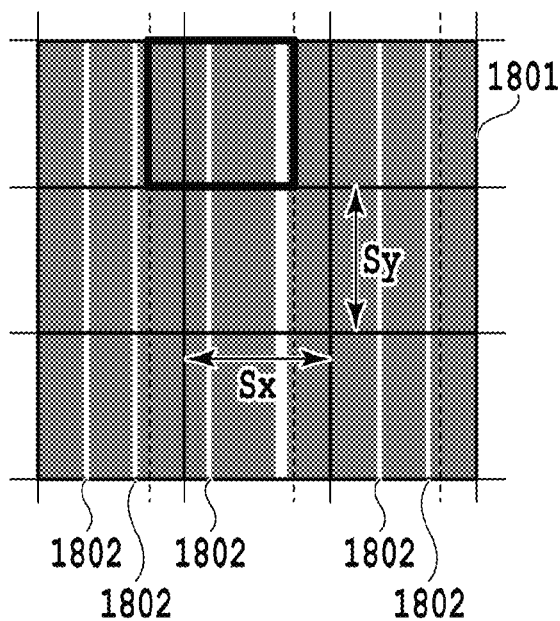
FIG.10C

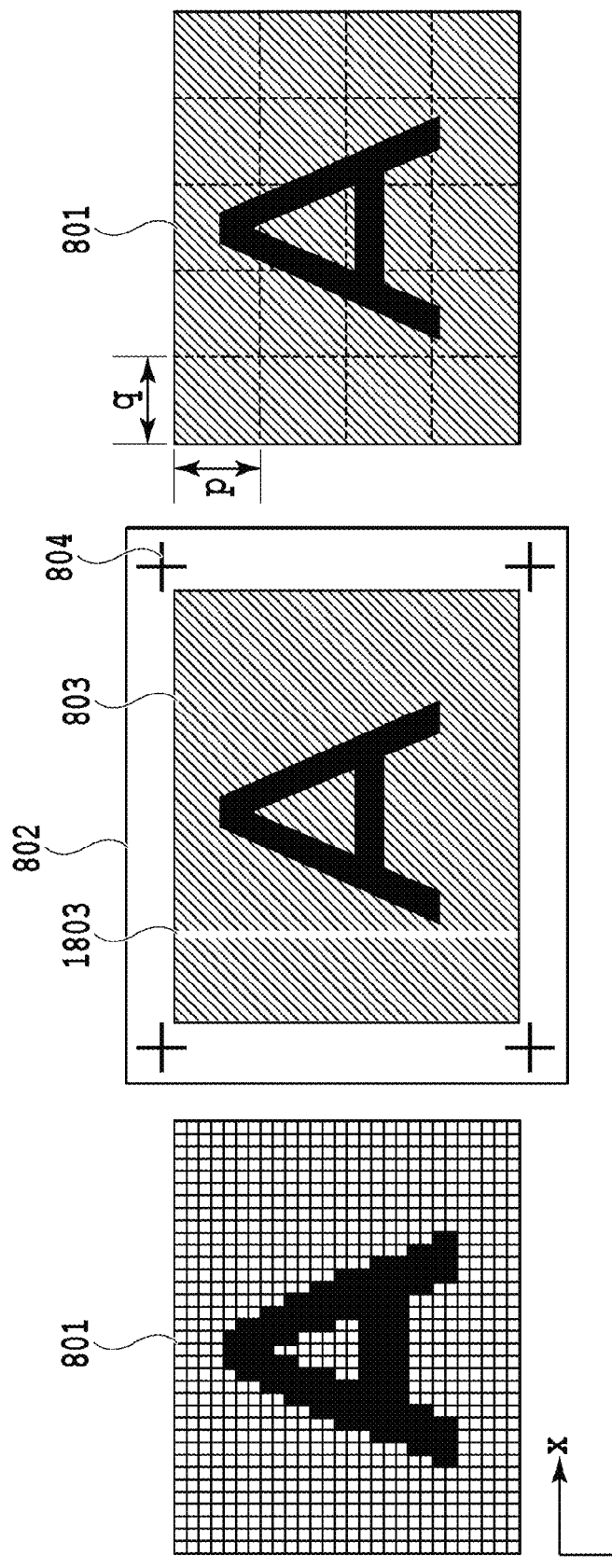

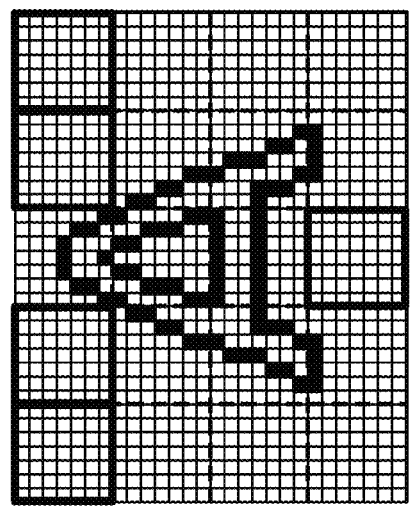
FIG.14B
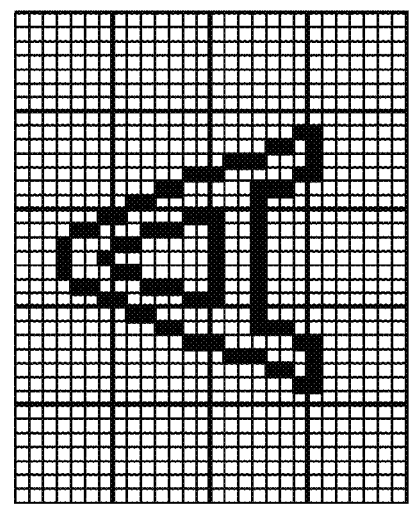
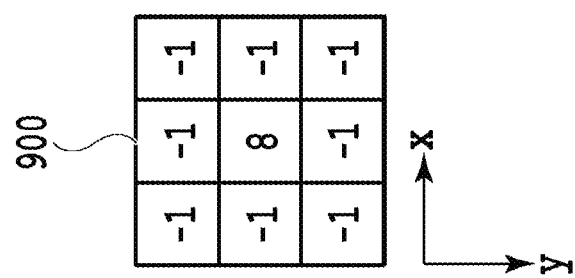
FIG.14A

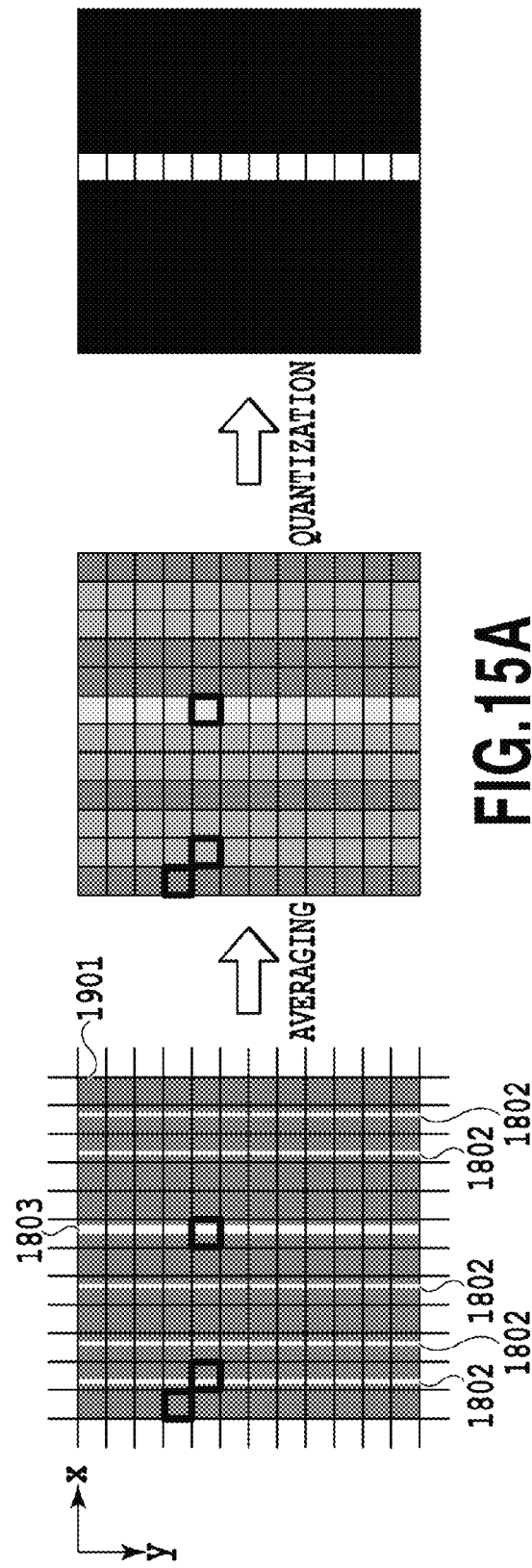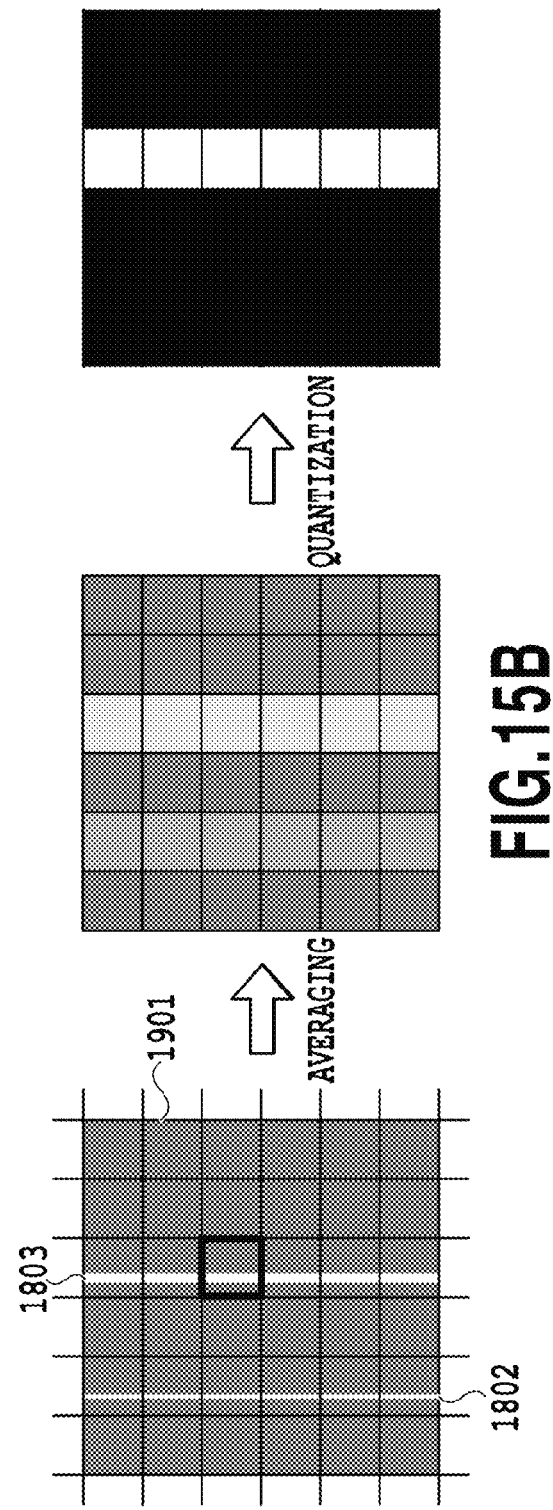

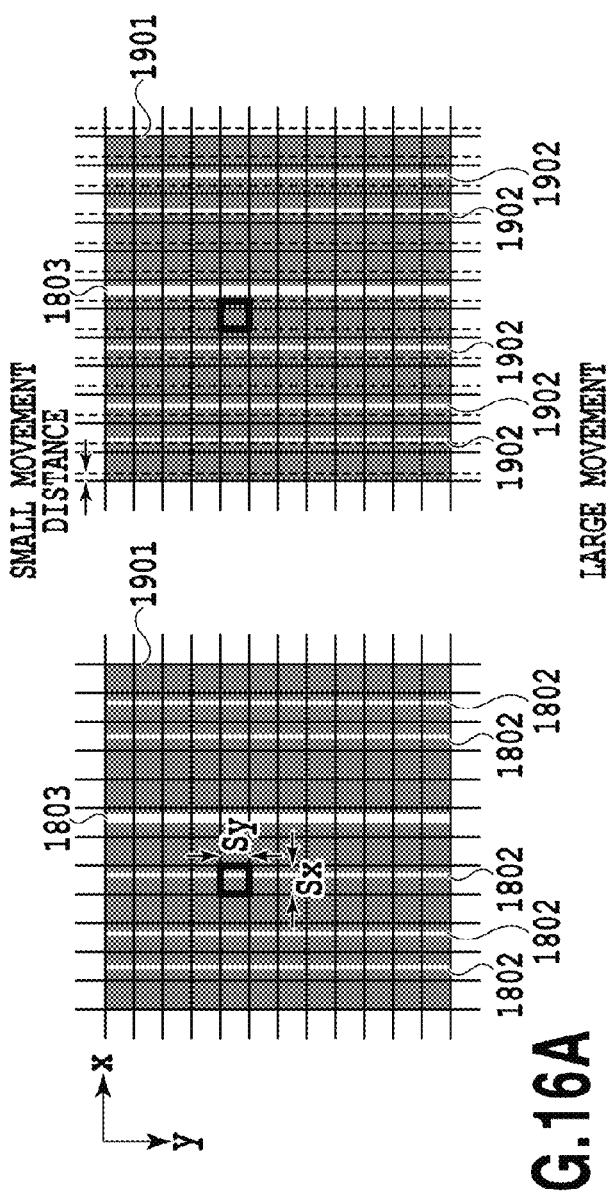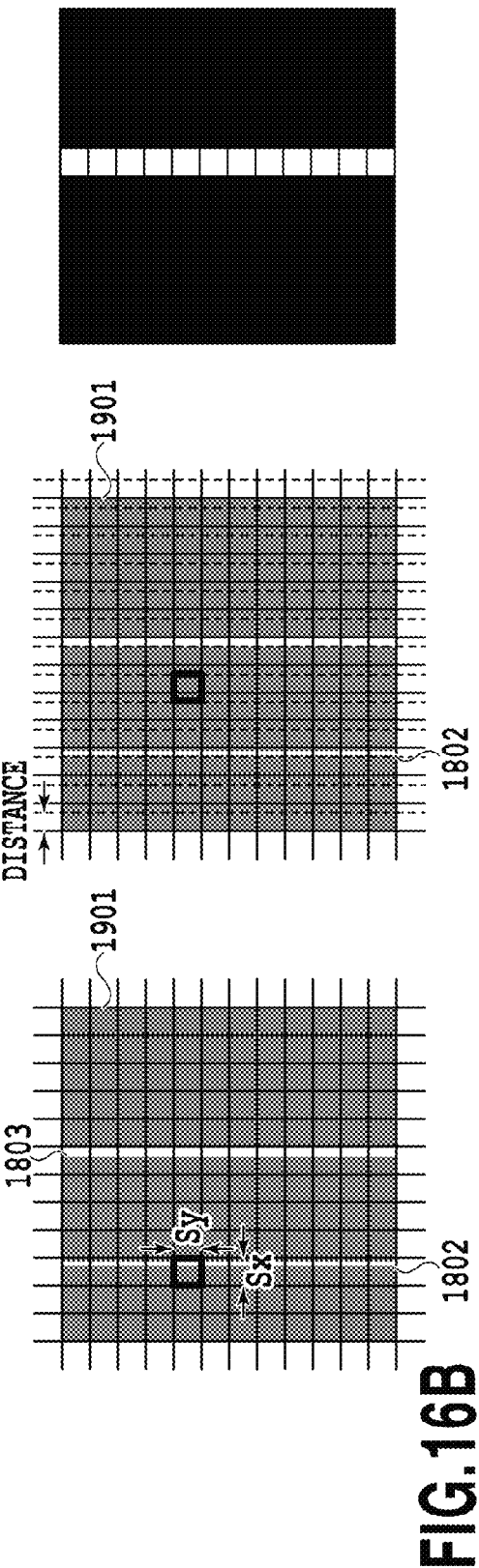
FIG.16A
FIG.16B

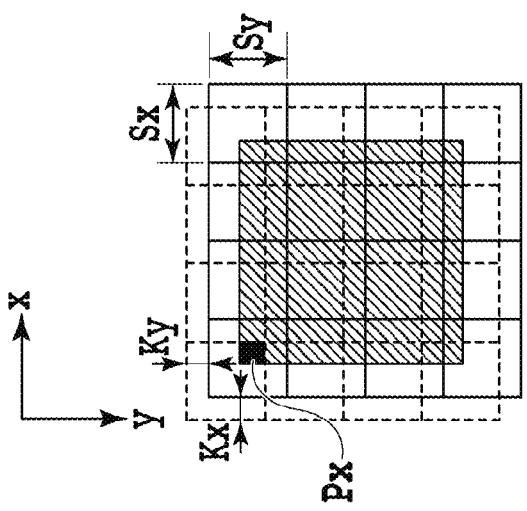
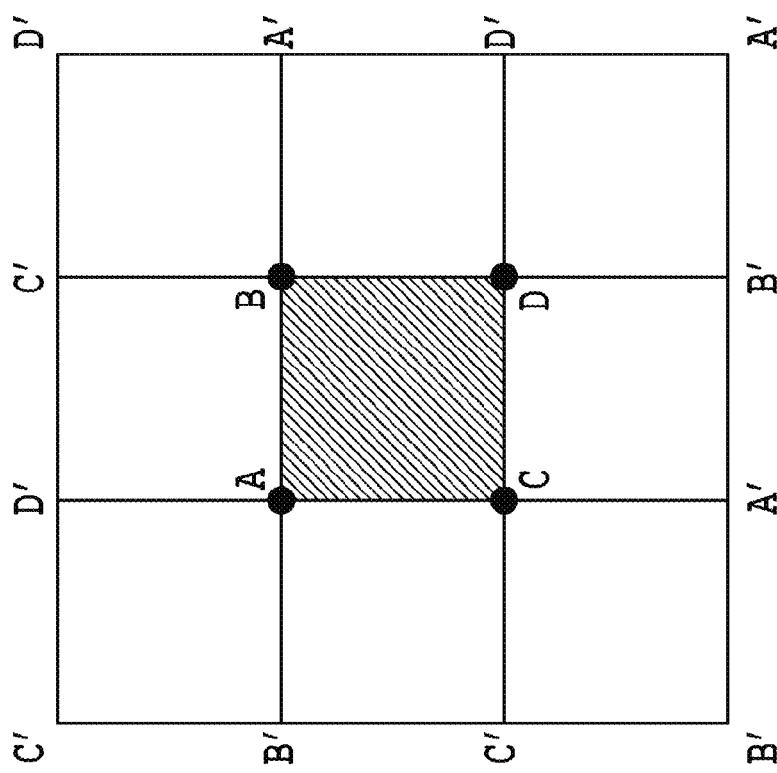
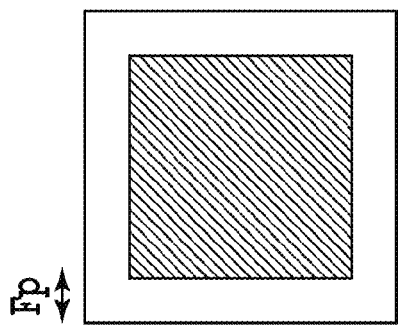

ics of the Japan Society

IMAGE PROCESSING APPARATUS AND IMAGE PROCESSING METHOD

BACKGROUND OF THE INVENTION

Field of the Invention

The present invention relates to an image processing apparatus and image processing method adapted to extract a unique portion of an inspection object, such as a defect.

Description of the Related Art

Japanese Patent Laid-Open No. 2013-185862 or ""KIZUKI" Algorithm inspired by Peripheral Vision and Involuntary Eye Movement", Journal of the Japan Society for Precision Engineering, Vol. 79, No. 11, 2013, p. 1045-1049 discloses an algorism for detecting a defect of an inspection object in accordance with a human visual mechanism. Specifically, after imaging an inspection object, the resulting image is divided into division areas having a predetermined size, and averaging and quantization are performed on each of the division areas. In addition, in multiple cases where the size and/or phase of a division area are changed, such a process is performed, and from a result of adding the resulting quantized values, the presence or absence of a defect is determined, and if present, the position of the defect is also determined. By employing such a method, a defect of an inspection object can be efficiently extracted and made apparent without any human observation.

Also, Japanese Patent Laid-Open No. 2010-111031 discloses a method that when an inspection object is printed matter by an inkjet printing apparatus, suppresses a processing load on inspection and a reduction in inspection speed by first extracting a solid area where a defect specific to the printing apparatus is easily extracted, and inspecting the solid area.

However, when employing the algorithm disclosed in Japanese Patent Laid-Open No. 2013-185862 or the above-described Journal of the Japan Society for Precision Engineering, although a unique portion can be extracted from a uniform image, when attempting to extract a unique portion from an actually printed image, a unique portion present in original image data is also simultaneously detected. In order to avoid this, the method disclosed in Japanese Patent Laid-Open No. 2010-111031 can be also employed to inspect only a solid area; however, in this case, a defect inconspicuous in a solid area cannot be extracted.

SUMMARY OF THE INVENTION

The present invention is made in order to solve the above-described problems. Accordingly, an object of the present invention is to provide an image processing apparatus and image processing method that even when inspecting an actually printed image, without extracting a unique portion of the printed image, can effectively extract only a defect portion.

According to a first aspect of the present invention, there is provided an image processing apparatus adapted to detect a unique portion extending in a predetermined direction from a printed image, the image processing apparatus comprising: a generating unit configured to generate inspection target image data on a basis of read image data resulting from reading the image; a setting unit configured to set inspection target areas in the inspection target image data; and an extracting unit configured to perform an image processing for extracting the unique portion of the inspection target areas set by the setting unit, wherein the setting unit sets the inspection target areas so as to make a ratio of a range occupied by inspection target areas to an entire image area of the inspection target image data in the predetermined direction larger than a ratio of a range occupied by inspection target areas to the entire image area in a direction intersecting with the predetermined direction.

According to a second aspect of the present invention, there is provided an image processing method adapted to detect a unique portion extending in a predetermined direction from a printed image, the image processing method comprising: a generating step of generating inspection target image data on a basis of read image data resulting from reading the image; a setting step of setting inspection target areas in the inspection target image data; and an extracting step of performing an image processing for extracting the unique portion of the inspection target areas set by the setting step, wherein the setting step sets the inspection target areas so as to make a ratio of a range occupied by inspection target areas to an entire image area of the inspection target image data in the predetermined direction larger than a ratio of a range occupied by inspection target areas to the entire image area in a direction intersecting with the predetermined direction.

According to a third aspect of the present invention, there is provided a storage media that stores a program instructing a computer to perform an image processing method adapted to detect a unique portion extending in a predetermined direction from a printed image, wherein the image processing method comprising: a generating step of generating inspection target image data on a basis of read image data resulting from reading the image; a setting step of setting inspection target areas in the inspection target image data; and an extracting step of performing an image processing for extracting the unique portion of the inspection target areas set by the setting step, wherein the setting step sets the inspection target areas so as to make a ratio of a range occupied by inspection target areas to an entire image area of the inspection target image data in the predetermined direction larger than a ratio of a range occupied by inspection target areas to the entire image area in a direction intersecting with the predetermined direction.

Further features of the present invention will become apparent from the following description of exemplary embodiments (with reference to the attached drawings).

BRIEF DESCRIPTION OF THE DRAWINGS

FIGS. 10A to 10C are diagrams illustrating the case of reading an image including white lines;

FIGS. 12A to 12C are diagrams illustrating read image data and processing steps;

FIGS. 14A and 14B are diagrams for explaining a method for counting the number of edge pixels;

FIGS. 15A and 15B are diagrams illustrating a division size suitable for an inspection target area;

FIGS. 16A and 16B are diagrams illustrating a phase suitable for an inspection target area;

FIGS. 26A to 26C are diagrams for explaining a method for generating dummy data.

DESCRIPTION OF THE EMBODIMENTS

FIGS. 1A to 1D are diagrams illustrating examples of a form of an image processing apparatus 1 usable in the present invention. An image processing apparatus of the present invention is one that on taken image data, performs a popup process for making a user easily recognize a unique portion of a printed image and a process for making the apparatus itself make a determination, and as a system, can take various forms.

Figure 1A:
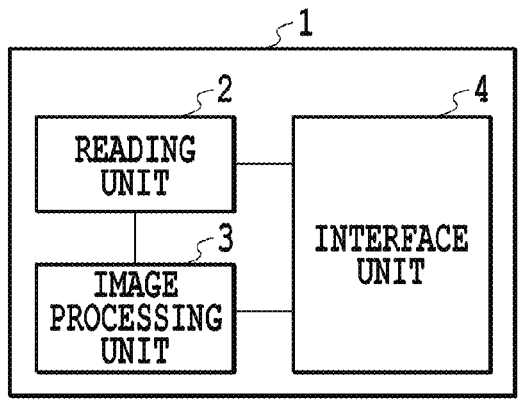
FIGS. 1A to 1D are diagrams illustrating examples of a form of an image processing apparatus 1 usable in the present invention.

FIG. 1A illustrates a form in which the image processing apparatus 1 includes a reading unit 2. For example, this form corresponds to the case where a sheet on which a predetermined image is printed by an inkjet printing apparatus is placed on a reading table of the reading unit 2 inside the image processing apparatus 1 and imaged by an optical sensor or the like, and the resulting image data is processed by an image processing unit 3. The image processing unit 3 includes a CPU or an image processing accelerator capable of higher speed processing than the CPU, and controls a reading action by the reading unit 2 or performs a predetermined inspection process on the received image data.

Figure 1B:
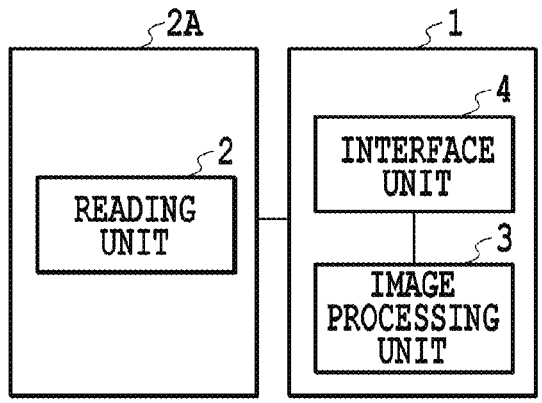

FIG. 1B illustrates a form in which the image processing apparatus 1 is externally connected to a reading apparatus 2A including a reading unit 2. For example, this form corresponds to a system in which a PC is connected to a scanner. As a method for the connection, a general connecting method such as USB, GigE, or CameraLink can be used.

Image data read by the reading unit 2 is provided to an image processing unit 3 through an interface 4, and the image processing unit 3 performs a predetermined inspection process on the received image data. Note that in this form, the image processing apparatus 1 may be further externally connected to a printing apparatus including a printing unit 5.

Figure 1C:
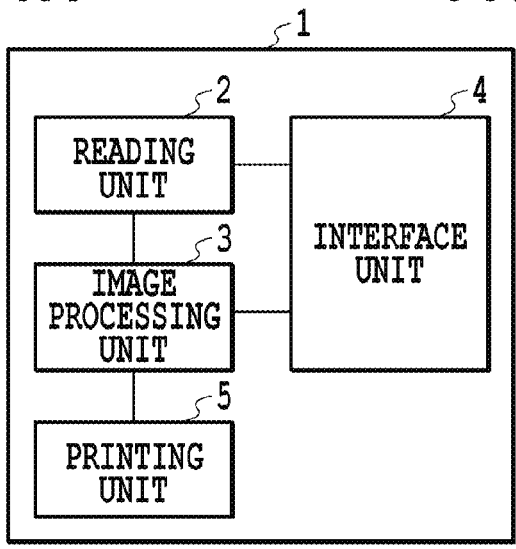

FIG. 1C illustrates a form in which the image processing apparatus 1 includes a reading unit 2 and a printing unit 5. For example, this form corresponding to a multifunction peripheral including all of a scanner function, a printer function, and an image processing function. An image processing unit 3 controls all of a printing action in the printing unit 5, a reading action in the reading unit 2, an inspection process to be performed on an image read by the reading unit 2, and other actions and processes.

Figure 1D:
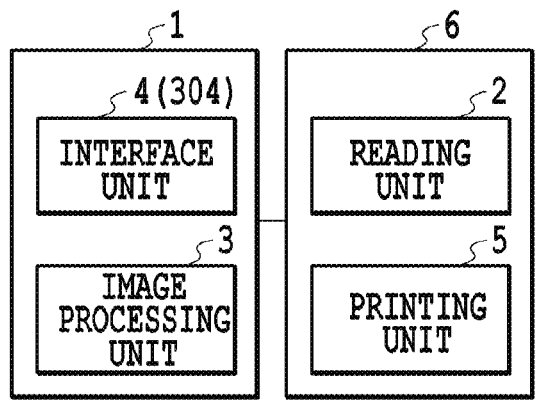

FIG. 1D illustrates a form in which the image processing apparatus 1 is externally connected to a multifunction peripheral 6 including a reading unit 2 and a printing unit 5. For example, this form corresponds to a system in which a PC is connected to a multifunction peripheral including both of a scanner function and a printer function.

The image processing apparatus 1 of the present invention can employ any of the forms in FIGS. 1A to 1D. In the following, embodiments of the present invention will be described in detail while taking the case of employing the form in FIG. 1D as an example.

First Embodiment

Figure 2:
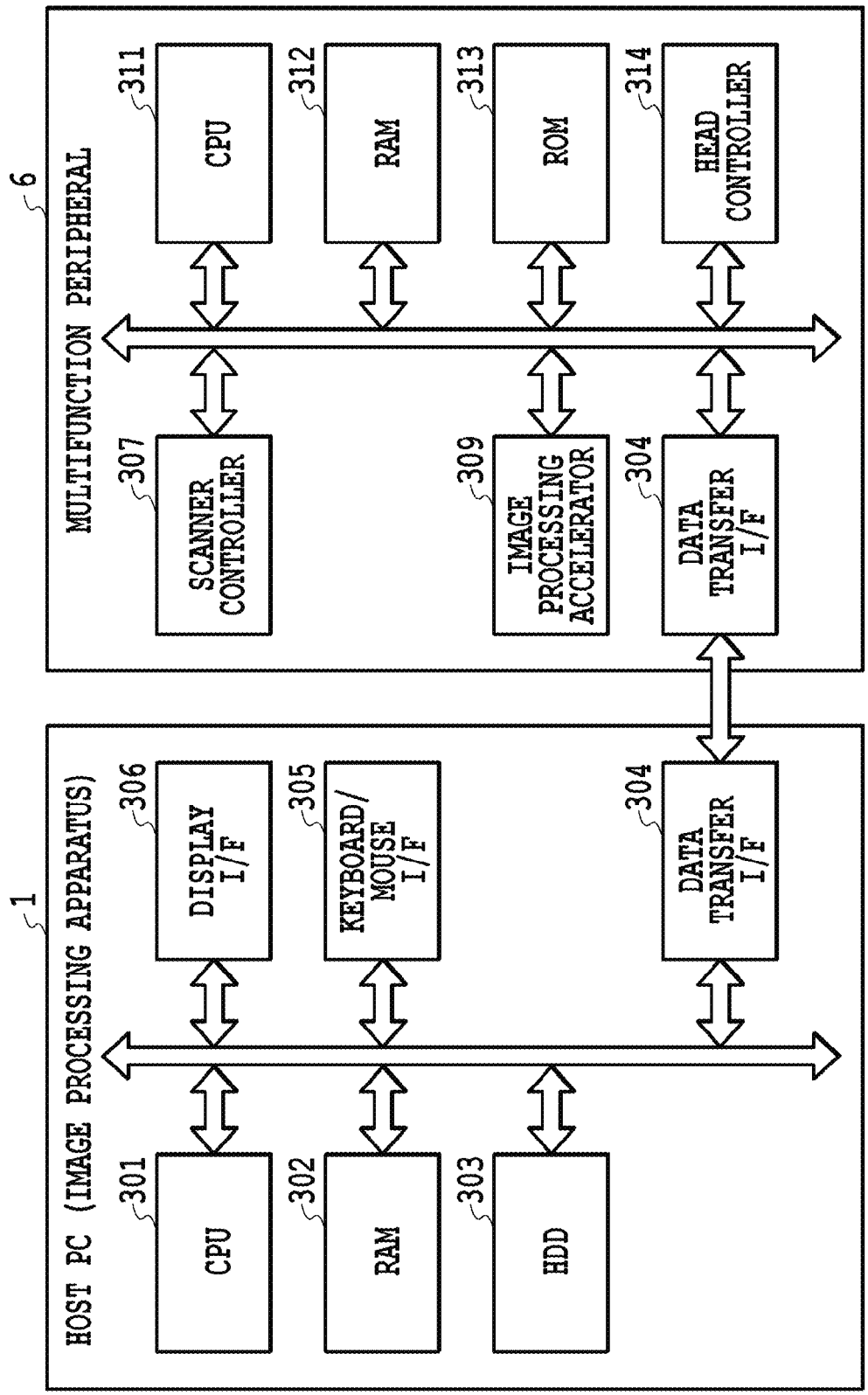
FIG. 2 is a block diagram for explaining a control configuration in an image processing system.

FIG. 2 is a block diagram for explaining the control configuration in the form of FIG. 1D. The image processing apparatus 1 is made up of a host PC and the like, in which a CPU 301 performs various processes in accordance with programs held in an HDD 303 while using a RAM 302 as a work area. For example, the CPU 301 generates image data printable by the multifunction peripheral 6 in accordance with a command received from a user through a keyboard/mouse I/F 305 or a program held in the HDD 303, and transfers the image data to the multifunction peripheral 6. Also, the CPU 301 performs a predetermined process on image data received from the multifunction peripheral 6 through a data transfer I/F 304 in accordance with a program stored in the HDD, and displays a result of the process or various pieces of information on an unillustrated display through a display I/F 306.

On the other hand, in the multifunction peripheral 6, a CPU 311 performs various processes in accordance with programs held in a ROM 313 while using a RAM 312 as a work area. In addition, the multifunction peripheral 6 includes: an image processing accelerator 309 for performing a high-speed image process; a scanner controller 307 for controlling the reading unit 2; and a head controller 314 for controlling the printing unit 5.

The image processing accelerator 309 is hardware adapted to be able to perform an image process at higher speed than the CPU 311. Also, the CPU 311 writes parameters and data necessary for the image process into a predetermined address of the RAM 312, and thereby the image processing accelerator 309 is activated, and after reading the parameters and data, performs the predetermined image process on the data. Note that the image processing accelerator 309 is not an indispensable component, and the CPU 311 can perform an equivalent process.

The head controller 314 supplies print data to a print head 100 provided in the printing unit 5 as well as controlling a printing action of the print head 100. Also, the CPU 311 writes print data printable by the print head 100 and control parameters into a predetermined address of the RAM 312, and thereby the head controller 314 is activated, and performs an ejecting action in accordance with the print data.

The scanner controller 307 controls individual reading elements arrayed in the reading unit 2 and at the same time, outputs RGB luminance data obtained from the reading elements to the CPU 311. The CPU 311 transfers the obtained RGB luminance data to the image processing apparatus 1 through a data transfer I/F 310. As a method for the connection between the data transfer I/F 304 of the image processing apparatus 1 and the data transfer I/F 310 of the multifunction peripheral 6, a method such as USB, IEEE 1394, or LAN can be used.

Figure 3:
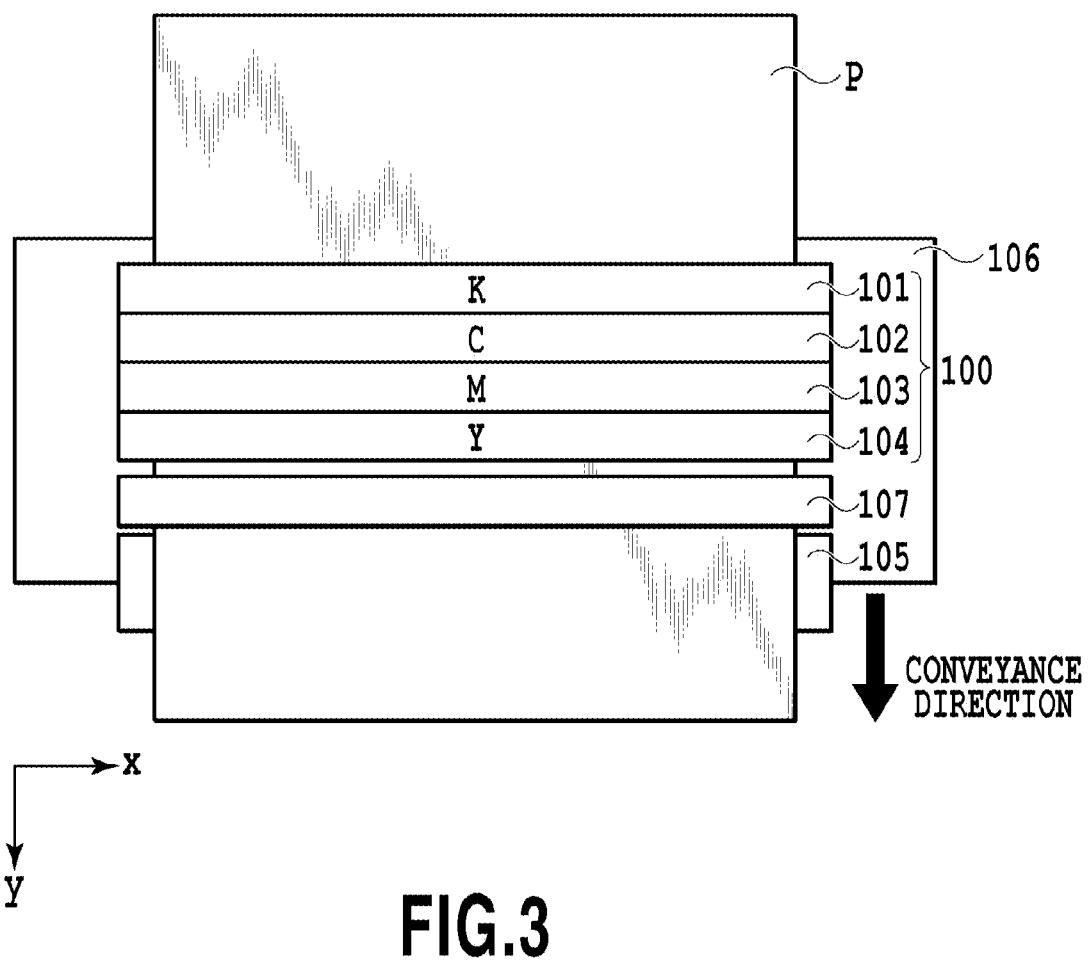
FIG. 3 is a schematic configuration diagram of an inkjet printing apparatus as a multifunction peripheral usable in the present invention.

FIG. 3 is a schematic configuration diagram of an inkjet printing apparatus (hereinafter also simply referred to as a printing apparatus) usable as the multifunction peripheral 6 in the present embodiment. The printing apparatus in the present embodiment is a full-line type printing apparatus, in which the print head 100 and a read head 107 both having the same width as that of a possible sheet P as a print medium or an inspection object are parallel arranged. The print head 100 includes four printing element arrays 101 to 104 respectively adapted to eject black (K), cyan (C), magenta (M), and yellow (Y) inks, and these printing element arrays 101 to 104 are parallel arranged in a conveyance direction of the sheet P (Y direction). Further downstream of the printing element arrays 101 to 104, the read head 107 is disposed. In the read head 107, multiple reading elements for reading a printed image are arrayed in an X direction.

When performing a printing process or a reading process, the sheet P is conveyed in the Y direction of the diagram at a predetermined speed along with the rotation of a conveyance roller 105, and during the conveyance, the printing process by the print head 100 and the reading process by the read head 107 are performed. The sheet P in a position where the printing process by the print head 100 and the reading process by the read head 107 are performed is supported from below by a flat plate-shaped platen 106, and thereby the distances from the print head 100 and the read head 107, and smoothness are kept.

Figure 4A:
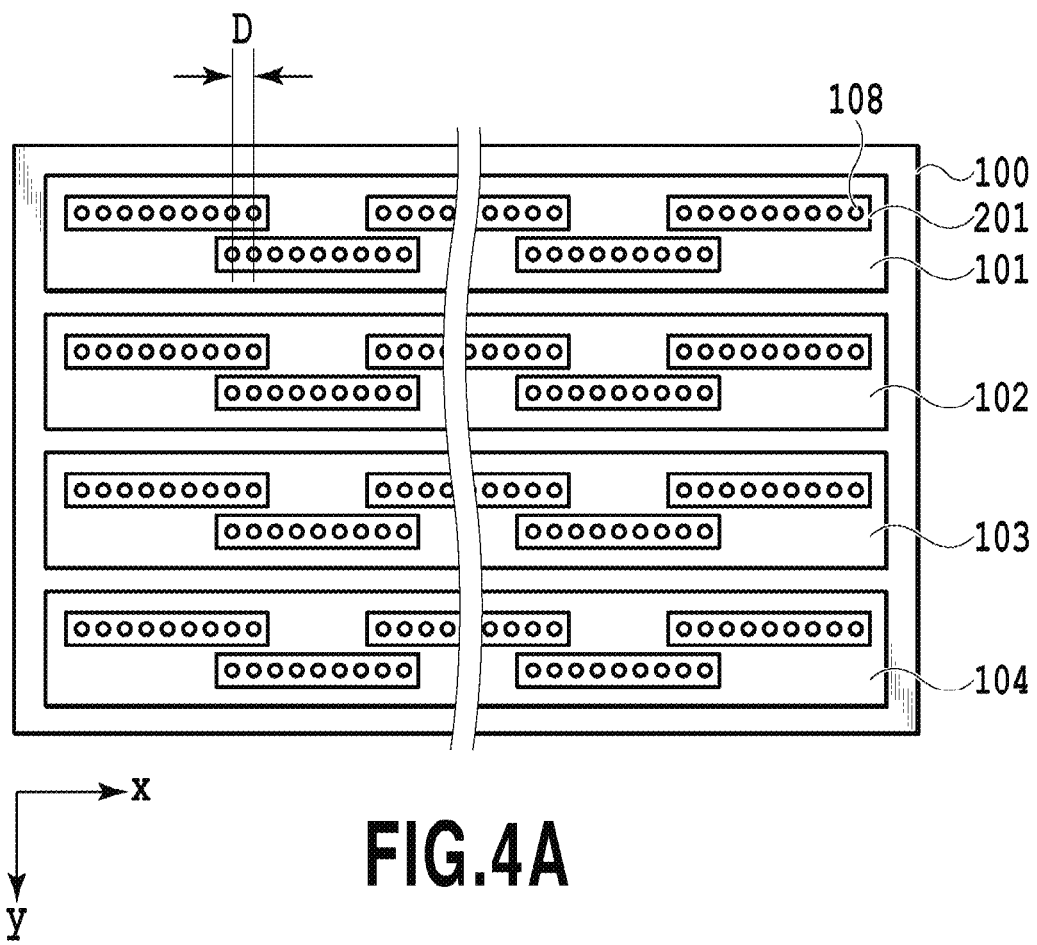
FIGS. 4A and 4B are diagrams illustrating the array configuration of printing elements and the array configuration of reading elements, respectively.
Figure 4B:
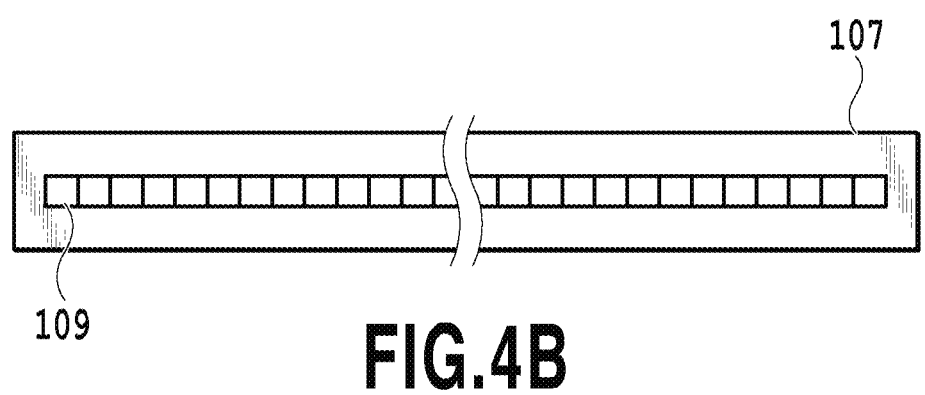

FIGS. 4A and 4B are diagrams illustrating the array configuration of the printing elements in the print head 100 and the array configuration of the reading elements in the read head 107, respectively. In the print head 100, in each of the printing element arrays 101 to 104 corresponding to the respective ink colors, multiple printing element substrates 201 each on which multiple printing elements 108 are arrayed at constant pitches are arranged continuously in the X direction and alternately in the Y direction while providing overlap regions D. Individual printing elements 108 ejects corresponding inks at a constant frequency in accordance with print data onto a sheet P conveyed in the Y direction at a constant speed, and thereby an image is printed on the sheet P at a resolution corresponding to the array pitch of the printing elements 108.

On the other hand, in the read head 107, multiple reading sensors 109 are arrayed in the X direction at predetermined pitches. The individual reading elements of the reading sensors 109 image at a predetermined frequency an image on a sheet P conveyed in the Y direction at the constant speed, and thereby the image printed on the sheet P can be read at the array pitches between the reading elements.

In the following, a unique portion detecting algorithm in the present embodiment will be specifically described. The unique portion detecting algorithm in the present embodiment is an algorithm for taking image an already printed image, and performing a predetermined image process on the resulting image data in order to extract a defect (unique portion). An apparatus for printing an image is not necessarily required to be the inkjet printing apparatus as the multifunction peripheral 6. However, in the following, the case where an image printed by the print head 100 of the multifunction peripheral 6 is read by the read head 107 will be described.

Figure 5:
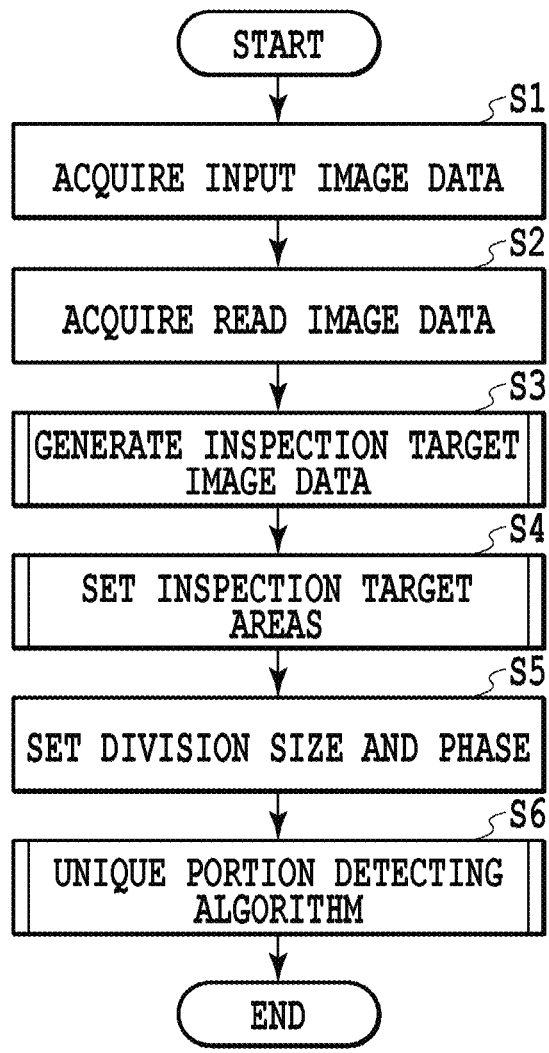
FIG. 5 is a flowchart illustrating the basic steps for defect detection in a first embodiment.

FIG. 5 is a flowchart for explaining the basic steps for unique portion detection performed by the image processing apparatus 1 of the present embodiment. When this process is started, in Step S1, the image processing apparatus 1 acquires input image data to be printed by the printing unit 5.

In subsequent Step S2, the image processing apparatus 1 acquires read image data obtained as a result of, in accordance with the input image data acquired in Step S1, printing by the printing unit 5 and reading by the reading unit 2. Specifically, the print head 100 is made to print the input image data acquired in Step S1, and the read head 107 is made to read an image in an area where the printing is complete. Note that the printing action and the reading action are not necessarily required to be performed during the same conveyance action of a sheet P. A sheet P having been subjected to the printing action and discharged outside may be again conveyed into the apparatus for the reading action, or an apparatus for the printing action and an apparatus for the reading action may be different ones.

In Step S3, on the basis of the input image data acquired in Step S1 and the read image data acquired in Step S2, the CPU 301 generates inspection target image data serving as an inspection target. Further, in Step S4, on the basis of the input image data acquired in Step S1, an inspection target area is set. The inspection target area refers to, among the inspection target image data generated in Step S3, an area to which the unique portion detecting algorithm is to be actually applied in Step S6, and in Step S4, multiple inspection target areas as described are set. Algorithms for generating the inspection target image data in Step S3 and setting the inspection target areas in Step S4 will be described later in detail.

In Step S5, a division size and phase used for the unique portion detecting algorithm to be performed in subsequent Step S6 are set independently for each of the inspection target areas set in Step S4. The definitions of the division size and the phase will be described later in detail; however, in Step S5, at least one or more division sizes and phases suitable for each of the inspection target areas are set. The relationship between an inspection target area, and a division size and phase suitable for the inspection target area will also be described later in detail.

In Step S6, the unique portion detecting algorithm is performed on each of the inspection target areas set in Step S3.

Figure 6:
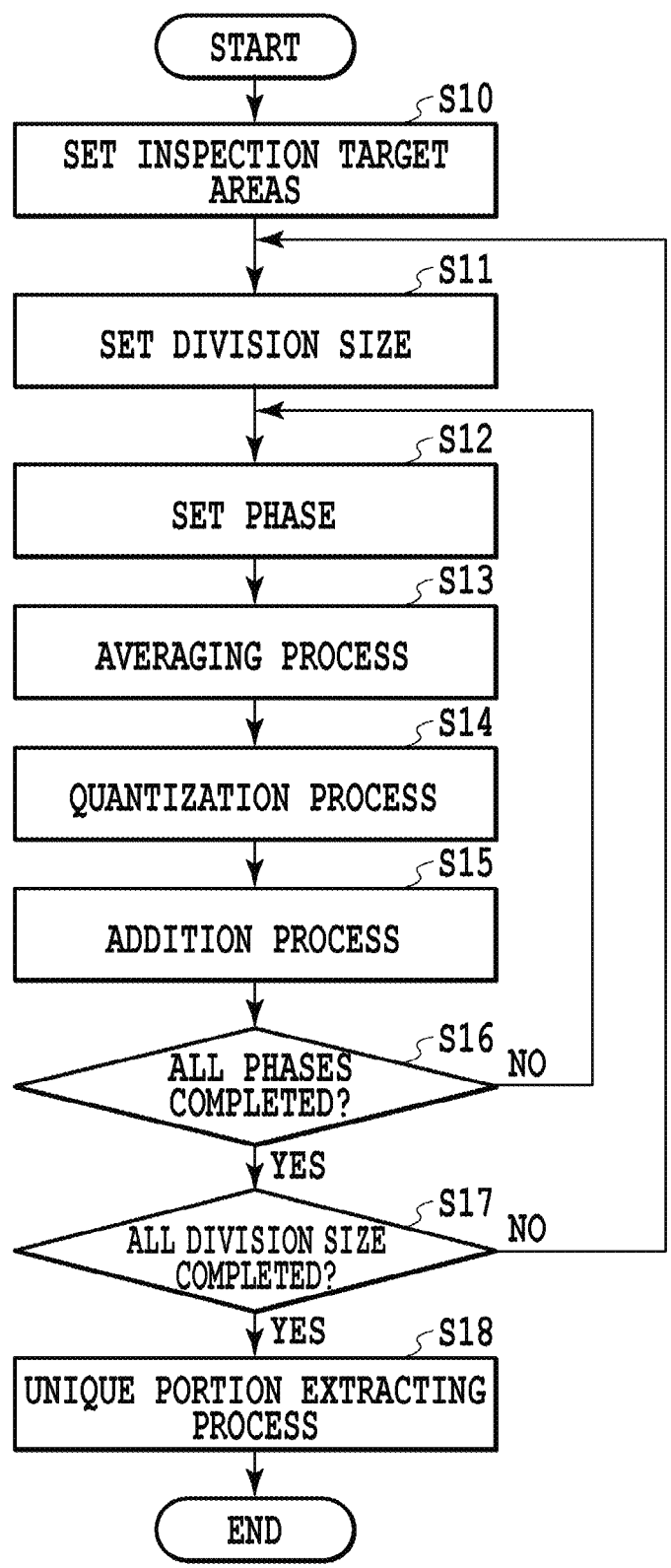
FIG. 6 is a flowchart illustrating a defect detecting algorithm in the first embodiment.

FIG. 6 is a flowchart for explaining the steps of the unique portion detecting algorithm performed by the CPU 301 in Step S6. When this process is started, in Step S10, the CPU 301 first sets one inspection target area from among the multiple inspection target areas set in Step S4. In subsequent Step S11, one division size is set from among the division sizes that are suitable for the inspection target area and set in Step S5. Note that a division size refers to a pixel size of a division area used when performing a unique portion extracting process. Then, in Step S12, from among multiple phases corresponding to the division size set in Step S11, one phase is set. Further, in Step S13, on the basis of the division size set in Step S11 and the phase set in Step s12, the image data acquired in Step S2 is divided to perform an averaging process.

Figure 7A:
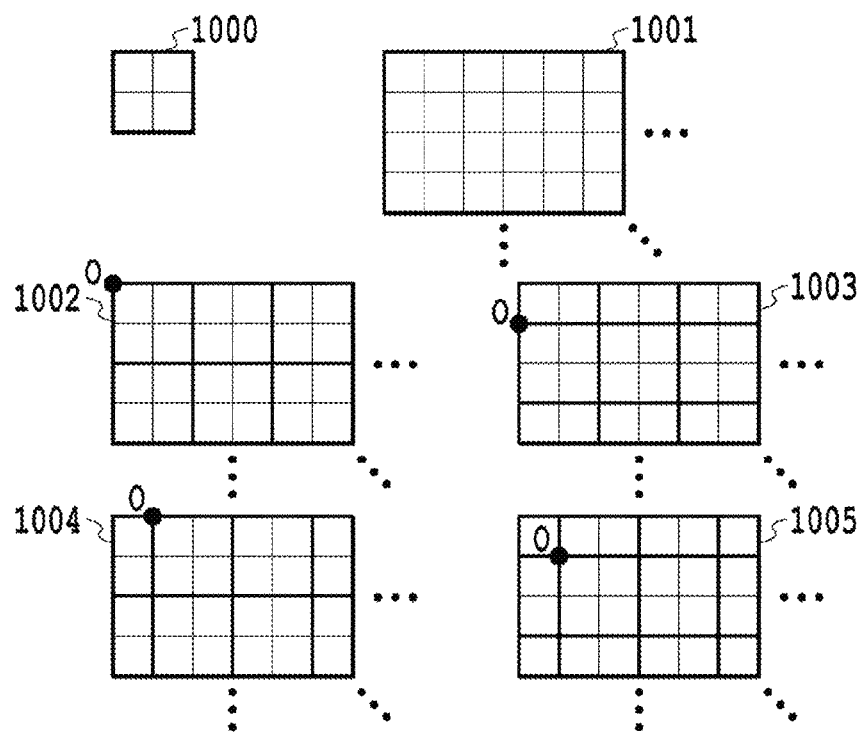
FIGS. 7A and 7B are diagrams for explaining image data division states.
Figure 7B:
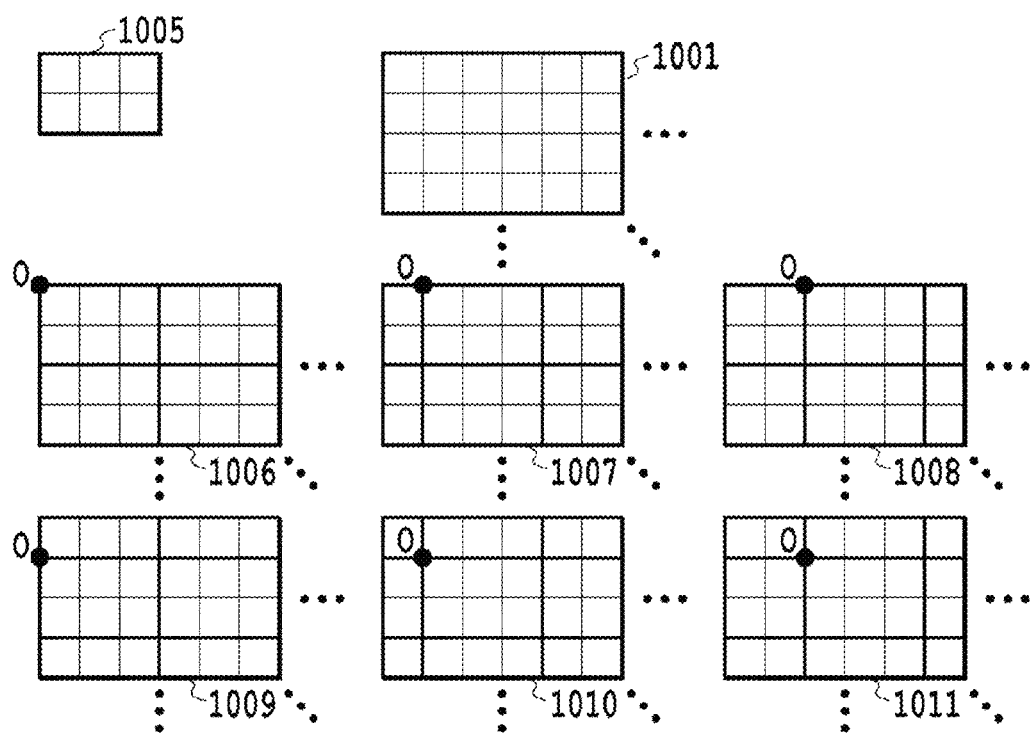

FIGS. 7A and 7B are diagrams for explaining image data division states based on a division size and a phase. FIG. 7A illustrates the case where the division size is set to 2×2 pixels, and FIG. 7B illustrates the case where the division size is set to 3×2 pixels. In the case where the division size 1000 is set to 2×2 pixels as in FIG. 7A, an image data area 1001 is divided on a 2-by-2 pixel basis, and also can be divided in four different ways as indicated by 1002 to 1005. In this way, the phase can be considered as indicating the origin O of a designated division size. In the case where the division size 1005 is set to 3×2 pixels as in FIG. 7B, the image data area 1001 can be divided in six different ways as indicated by 1006 to 1011, meaning that six different phases are present.

Returning to FIG. 6, in Step S13, the averaging process is performed on each of division areas obtained by the division in Step S12. Specifically, an average value of pieces of luminance data of multiple pixels included in each of the division areas is obtained. When doing this, the average value of the pieces of luminance data of the respective pixels may be obtained by directly averaging pieces of RGB luminance data of the respective pixels, or by multiplying the pieces of RGB luminance data respectively by a predetermined weighting coefficient and then adding the pieces of weighted data. Further, luminance data of one of RGB colors may be directly used as luminance data of a corresponding pixel.

In Step S14, the average value calculated in Step S13 is quantized on a pixel basis. One quantized average value corresponding to a division area may be laid on each pixel in the division area. The quantization may be binarization or multivalued quantization into several levels. In doing so, quantized data in a state where quantized values of respective pixels are uniform within each of the division areas is obtained.

In Step S15, the quantized values obtained in Step S14 are added to addition image data. The addition image data refers to image data indicating a result of adding pieces of quantized data obtained when variously changing the division size and the phase. When the quantized data obtained in Step S14 is based on the initial division size and an initial one of corresponding phases, the addition image data obtained in Step S15 is the same as the quantized data obtained in Step S14.

In subsequent Step S16, the image processing apparatus 1 determined whether or not all phases corresponding to a currently set division size have been processed. When the image processing apparatus 1 determines that a phase to be processed still remains, the flow returns to Step S12, where the next phase is set. On the other hand, when the image processing apparatus 1 determines that all the phases have been processed, the flow proceeds to Step S17.

FIGS. 8A to 9J are diagrams schematically illustrating the steps of the addition process in Step S15 in the case of a predetermined division size, which are sequentially performed on all phases. When the division size is set to 2×2 pixels, four different phases are present. In FIGS. 8A to 8D, in the process of sequentially changing the four different phases, the number of times of using luminance data of a peripheral pixel in order to perform the addition process of a target pixel Px is indicated on a pixel basis. On the other hand, when the division size is set to 3×3 pixels, nine different phases are present. In FIGS. 9A to 9I, in the process of sequentially changing the nine different phases, the number of times of using luminance data of a peripheral pixel in order to perform the addition process of a target pixel Px is indicated on a pixel basis.

Figure 8A:
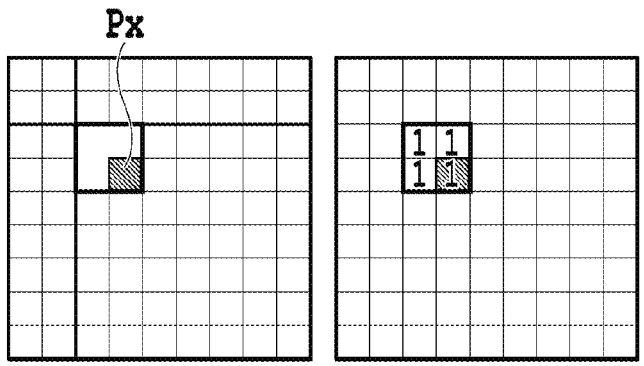
FIGS. 8A to 8E are diagrams schematically illustrating the steps of an addition process in the case of a division size of 2×2 pixels.
Figure 8B:
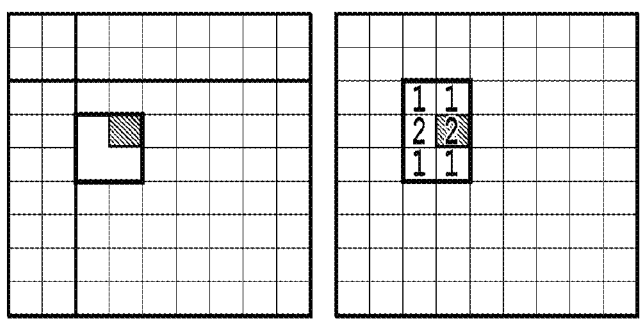
Figure 8C:
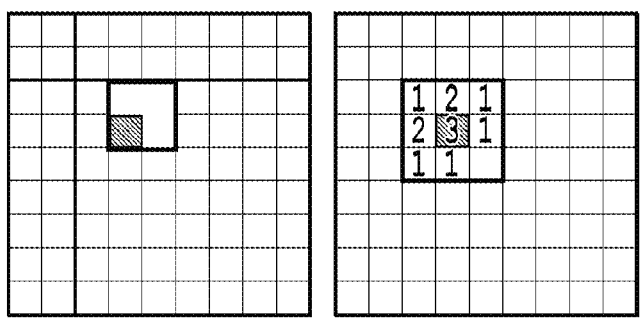
Figure 8D:
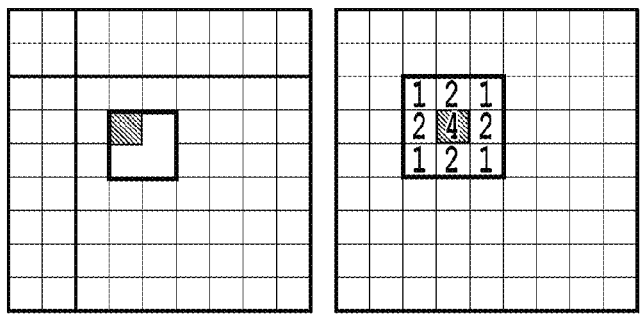
Figure 8E:
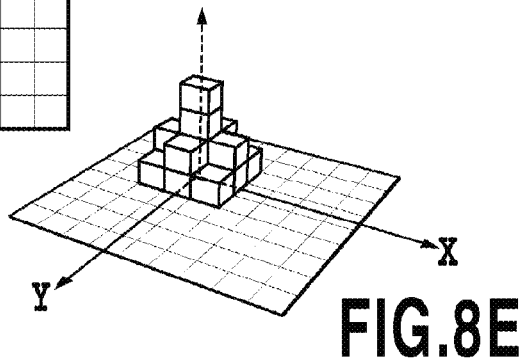
Figure 9A:
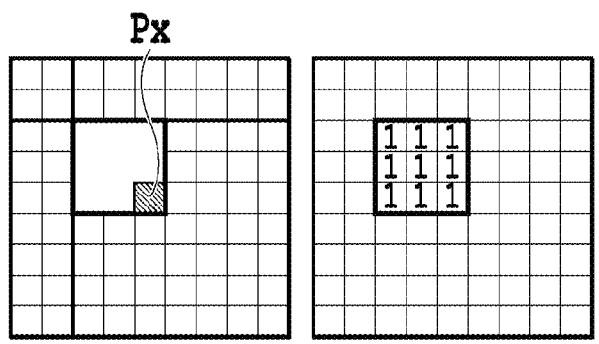
FIGS. 9A to 9J are diagrams schematically illustrating the steps of the addition process in the case of a division size of 3×3 pixels.
Figure 9B:
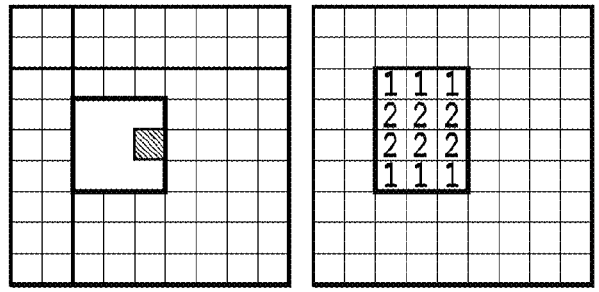
Figure 9C:
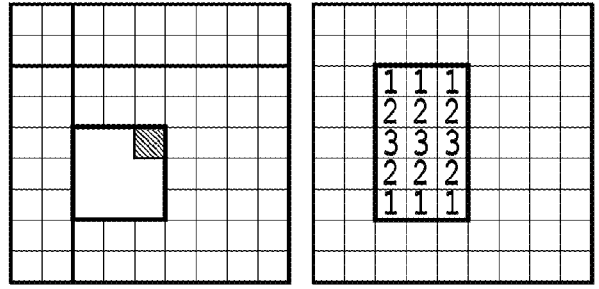
Figure 9D:
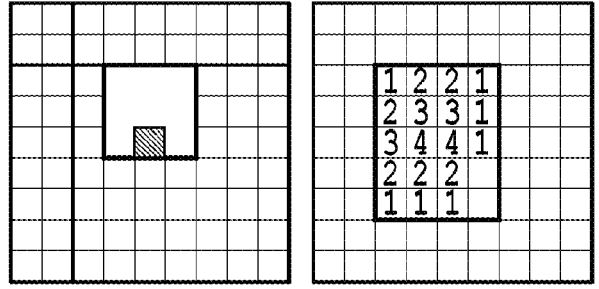
Figure 9E:
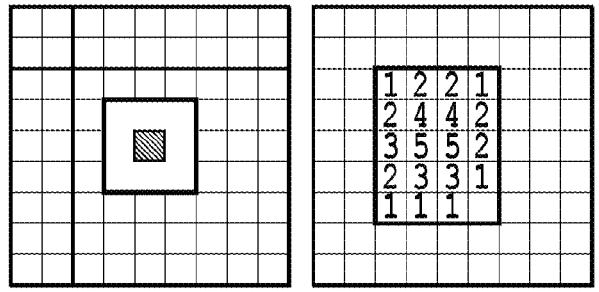
Figure 9F:
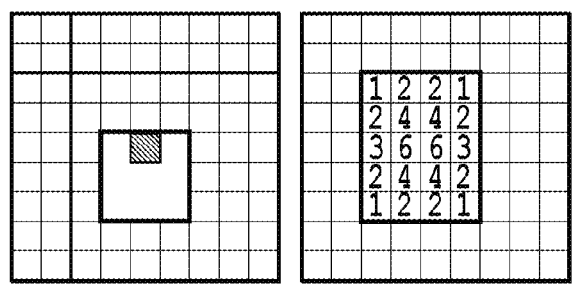
Figure 9G:
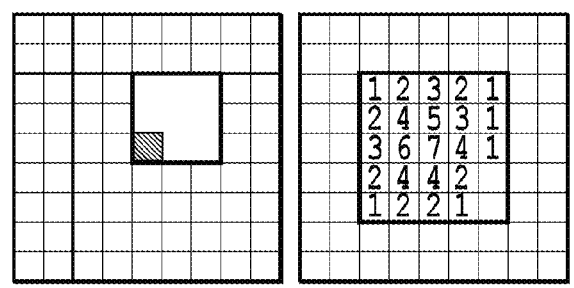
Figure 9H:
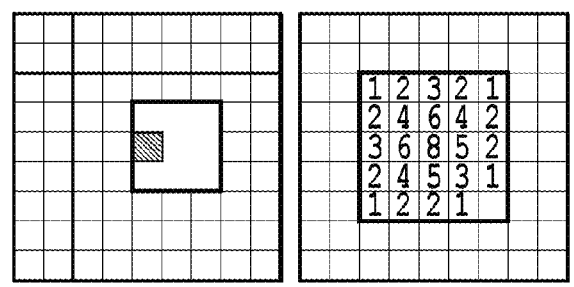
Figure 9I:
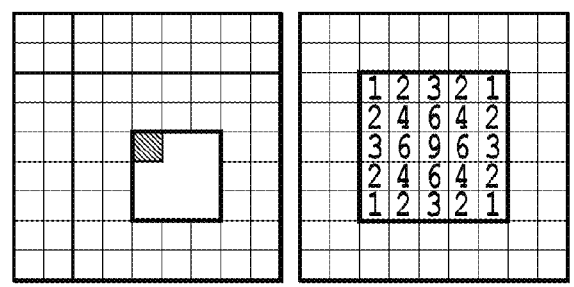
Figure 9J:
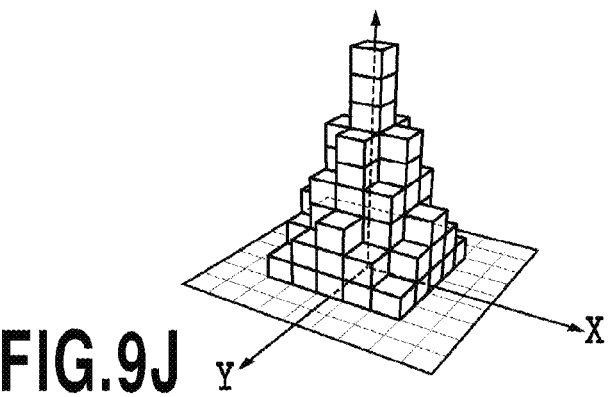

In any of the diagrams, the target pixel Px has the largest number of additions because the target pixel Px itself is used in all phases included in a division area, and has the largest contribution to an addition result. A pixel more distant from the target pixel Px has a smaller number of additions, and has a smaller contribution to an addition result. That is, a final result obtained is such that a filtering process is performed with the target pixel as the center, as shown by FIG. 8E or 9J.

Returning to the flowchart in FIG. 6, in Step S17, the image processing apparatus 1 determines whether or not all the division sizes set in Step S5 have been processed. When the image processing apparatus 1 determines that a division size to be processed still remains, the flow returns to Step S11, where the next division size is set. On the other hand, when the image processing apparatus 1 determines that all the division sizes have been processed, the flow proceeds to Step S18.

In Step S18, the unique portion extracting process is performed on the basis of currently obtained addition image data. A method for the extracting process is not particularly limited. A method adapted to make comparisons with pieces of peripheral luminance data to, as a unique spot, extract a spot where a variation in signal value is large, a method adapted to extract a unique spot using template matching or the like, or a publicly known determination processing method can be used. This process ends here.

Information on the unique portion extracted in accordance with the algorithm described with FIG. 6 can then be used for various applications. For example, in unique portion inspection of an image, the extracted unique portion may be displayed as a popup in order that an inspector can determine a defect portion easily. In this case, the inspector can check whether or not the portion is a defect portion on the basis of an image displayed as a popup, and repair the defect portion or eliminate the image as a defective image. Also, the information on the unique portion can also be stored for use in another system.

Further, in the case of a device having a function of correcting a defect to a normal state, the information on the unique portion can be set so as to be usable for a correction process. For example, when an area where luminance is high or low as compared with surrounding areas is extracted, an image processing parameter for correction can be prepared for the area. In addition, it is also possible to detect whether or not ejection failure is present in the inkjet printing apparatus, and if present, perform a maintenance process of the print head for a printing element at a relevant position.

In any case, as long as employing the unique portion detecting algorithm described with FIG. 6, since a unique portion is extracted on the basis of an addition result obtained while variously changing the division size and the phase, a substantial defect can be made apparent while appropriately suppressing noise caused by each read pixel.

However, even in the case of using the above unique portion detecting algorithm, when attempting to use the read head 107 to read and inspect an image in printing by the print head 100 in the inkjet printing apparatus illustrated in FIG. 3, there is a concern about taking a lot of time due to a large processing load for a lot of pixels. Also, in a case where an inspection target image itself includes an area where luminance is extremely high or low, the area may be extracted as a unique portion.

For example, as in FIG. 10A, consider the case where in a read image 1801 including white line images 1802 extending in the Y direction, a white stripe 1803 desired to be extracted as a unique portion occurs. As a result of employing the above-described unique portion detecting algorithm to perform the averaging process on such an image for each division area 1805, as illustrated in FIG. 10B, there is little difference between division areas where the white stripe 1803 is present and division areas where the white stripe 1803 is absent. In addition, in this state, when shifting a phase of a division area as in FIG. 10C, the presence of the white stripe 1803 also affects addition image data of a target pixel in a position where the white stripe 1803 is absent, and consequently the target pixel may be extracted as a unique portion.

In order to avoid such a situation, in the present embodiment, in Steps S3 to S6 before performing the above-described unique portion detecting algorithm (in Step S6 of FIG. 5), a process described as follow is performed. Specifically, first, in Step S3, inspection target image data suppressing the effect of input image data is generated on the basis of read image data. Subsequently, in Step S4, image areas in which it is possible to surely extract a white stripe that is caused by ejection failure of a printing element and is particularly focused on in the present embodiment are selected as inspection target areas while keeping a processing load as low as possible. Further, in Step S5, for each of the inspection target areas set in Step S4, a division size and phase suitable for the unique portion detecting algorithm to be performed in Step S6 are set. In the following, the features of a white stripe as a detection target in the present embodiment, and the generation of an inspection target image and the setting of inspection target areas for handling the white stripe will be specifically described.

Figure 11B:
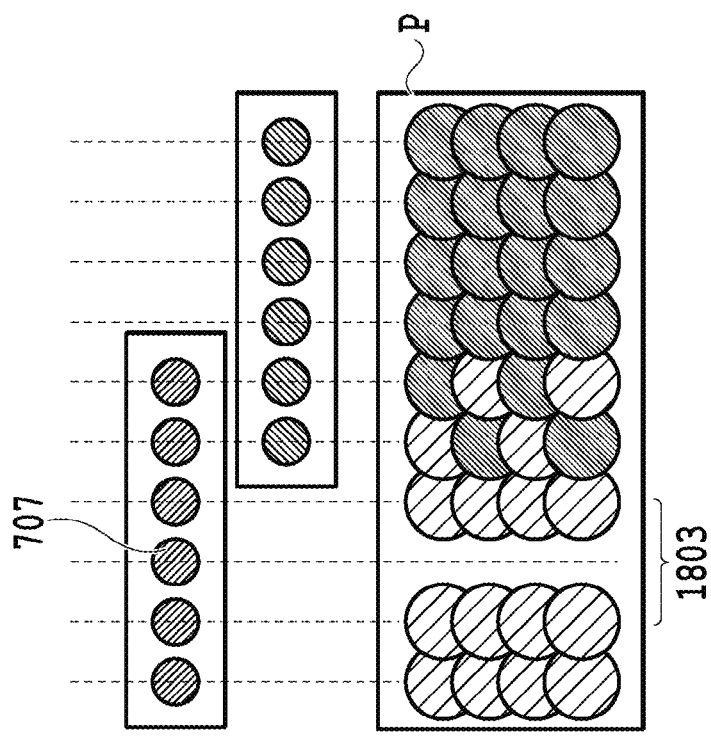
FIGS. 11A and 11B are diagrams illustrating a white stripe caused by ejection failure of a printing element.
Figure 11A:
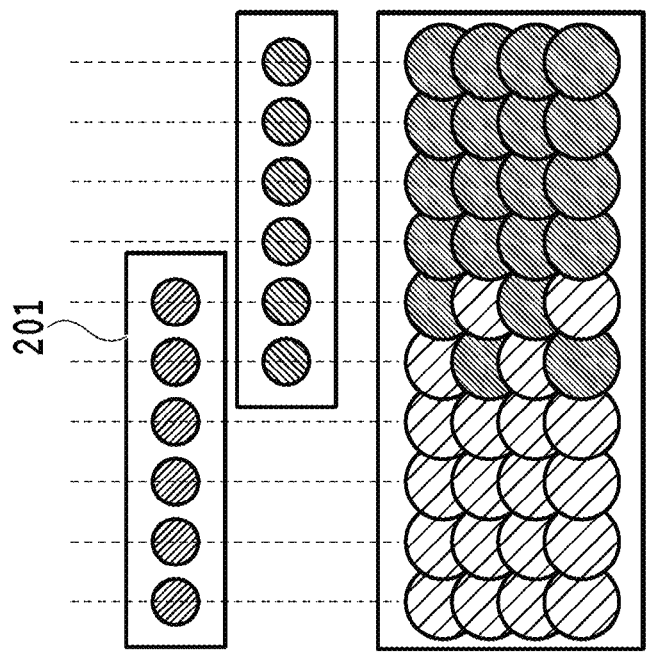

FIGS. 11A and 11B are diagrams for explaining a white stripe that is caused by ejection failure of a printing element and desired to be extracted as a unique portion particularly in the present embodiment. Each of the diagrams illustrates an array state of printing elements in one of the printing element arrays 101 to 104 illustrated in FIG. 4A and the layout of dots printed on a sheet P by the individual printing elements. FIG. 11A illustrates a state where ejection failure does not occur in any of the printing elements, and FIG. 11B illustrates a state where ejection failure occurs in a printing element 707. In the case where ejection failure occurs in one printing element, as can be seen in FIG. 11B, no dot is arranged in an area to be printed by that printing element, and a white stripe 1803 extending in the Y direction appears on the sheet P.

The present embodiment intends to surely extract such a white stripe as a unique portion. For this purpose, an inspection target image is set in the X direction so as to cover the entire image area of the printing elements arrayed in the X direction in order to make it possible to surely extract the ejection failure even if ejection failure occurs in any of the printing elements. On the other hand, since the white stripe extends in the Y direction, only a partial area is selected in the Y direction to reduce a processing load.

FIGS. 12A to 12C are diagrams illustrating a specific example of input image data acquired in Step S1 of FIG. 5 and read image data acquired in Step S2. FIG. 12A illustrates an example of input image data 801 acquired in Step S1, in which each square corresponds to one pixel area. This example illustrates the case where a black character "A" is printed in a uniform gray halftone image.

On the other hand, FIG. 12B illustrates read image data 802 obtained by the reading unit 2 reading an image printed on a sheet P by the printing unit 5 in accordance with the input image data 801. The read image data 802 includes: print area data 803 corresponding to an area printed in accordance with the input image data 801; and data corresponding to a blank area of the sheet P surrounding the printed area. When performing the printing action in accordance with the input image data 801, the CPU 301 adds cutout marks 804 at the four corners of the input image data 801 through the image processing accelerator 309, and therefore within the read image data 802 as well, the cutout marks 804 appear. FIG. 12B illustrates the case where one ejection failure printing element is included in the print head 100, and in a position to be printed by that printing element, a white stripe 1803 occurs.

Figure 13A:
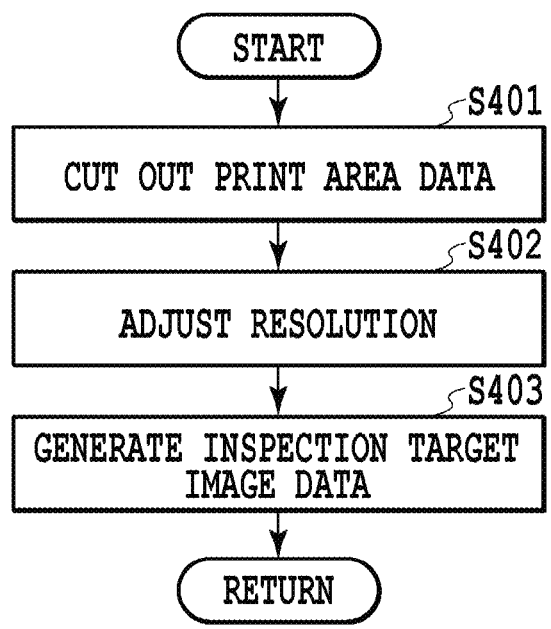
FIGS. 13A and 13B are flowcharts for explaining inspection target image data generating steps and inspection target area setting steps.
Figure 13B:
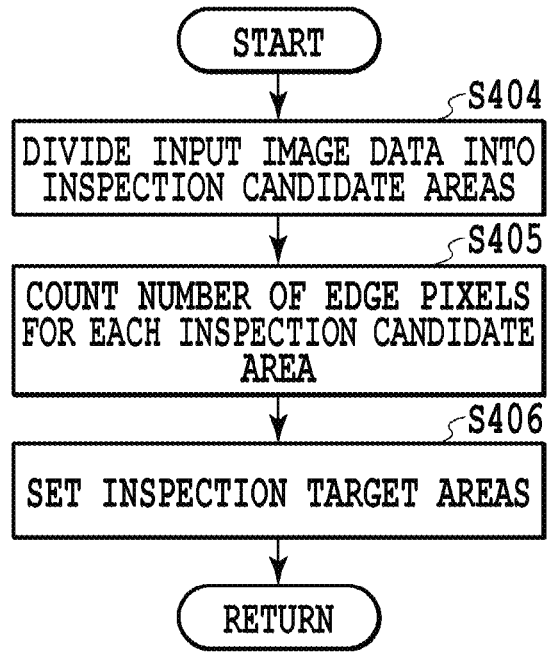

FIGS. 13A and 13B are flowcharts for explaining the processes performed by the CPU 301 in Steps S3 and S4 of FIG. 5. First, the inspection target image data generation process performed in Step S3 of FIG. 5 will be described in accordance with FIG. 13A.

When this process is started, in Step S401, the CPU 301 cuts the print area data 803 out of the read image data 802 with reference to the cutout marks 804. In subsequent Step S402, the CPU 301 makes a resolution adjustment so as to make the resolution of the print area data 803 and the resolution of the input image data 801 equal to each other. In the present embodiment, a resolution is not required to be the same between the input image data acquired in Step S1 and the read image data acquired in Step S2. In Step S402, when the both resolutions are not the same, the resolution adjustment is made so as to make the both equal to each other. When the resolutions of the input image data and the read image data acquired in Steps S1 and S2 are originally the same, this step is not required.

In subsequent Step S403, the CPU 301 generates inspection target image data on the basis of the input image data 801 and print area data 803 of which the resolutions have been adjusted in Step S402. Specifically, from the differences between RGB signal values of the input image data and RGB signal values of the print area data, the inspection target image data is generated. Note that when doing this, weighting may be applied to each of the RGB colors as expressed in Expression 1.

$$\text{Inspection target image data}_{k,l} = \text{abs}((\text{in}R_{k,l} \times 0.3 + \text{in}G_{k,l} \times 0.6 + \text{in}B_{k,l} \times 0.1) - (\text{scan}R_{k,l} \times 0.3 + \text{scan}G_{k,l} \times 0.6 + \text{scan}B_{k,l} \times 0.1))$$

Expression 1

Here, inR, inG, and inB represent the signal values of the input image data 801, and scanR, scanG, and scanB represent the signal values of the print area data 803. Also, the subscripts k and l represent pixel positions in the X and Y directions, respectively. As described, by taking the difference between the input image data 801 and the print area data 803 to generate the inspection target image data serving as a target for the unique portion extracting process, the effect of a unique portion of the input image data can be suppressed.

Meanwhile, the unique portion detecting algorithm described with FIG. 6 calculates addition data on the basis of the average value among all pixels included in a division area that moves around a target pixel Px as described with FIGS. 8A to 9J. For this reason, regarding a target pixel positioned in an end part of print image data, a division area around the target pixel includes an area where no data is present. In order to respond to such a situation, in Step S403, dummy image data is generated and attached in advance around actual inspection target image data.

FIGS. 26A to 26C are diagrams for explaining a method for generating dummy data. In each of the diagrams, an area corresponding to inspection target image data is indicated as a shaded area. As illustrated in FIG. 26A, when a target pixel Px indicated in black is positioned at a corner of an inspection target area, a division area (solid line) around the target pixel Px, and a division area (dashed line) having a phase shifted from that of the former respectively include areas (white areas) where no data is present. For this reason, in the present embodiment, dummy data is generated such that even when using the maximum division size to set the maximum movement distance with respect to the target pixel Px, appropriate data is present in any pixel included in any division area.

FIG. 26B is a diagram illustrating the method for generating dummy data. Four images obtained by inverting inspection target image data point-symmetrically with respect to apices A, B, C, and D, respectively, and four images obtained by inverting the inspection target image data line-symmetrically with respect to sides AB, BC, CD, and DA, respectively are generated, and these eight images surround the inspection target image data. It is here assumed that for example, the maximum division size and the maximum movement distance in the unique portion detecting algorithm are respectively represented by (Sx, Sy) and (Kx, Ky). In this case, the dummy data is only required to be generated in an area that is extended from the four edges of the inspection target image data by Fp=(Sx/2)+Kx in the ±X directions and by Fq=(Sy/2)+Ky in the ±Y directions. FIG. 26C illustrates the inspection target image data that is added with the dummy data in this manner. As described, the generation of the inspection target image data is completed.

Next, with reference to FIG. 13B, an inspection target area setting algorithm performed in Step S4 of FIG. 5 will be described. When this process is started, in Step S404, the CPU 301 first divides the input image data 801 into multiple inspection candidate areas. FIG. 12C illustrates an example of dividing the input image data 801 into 5 areas in the X direction and into 4 areas in the Y direction to generate 20 inspection candidate areas. In FIG. 12C, each of the inspection candidate areas has 7×7 pixels. In subsequent Step S405, the number of edge pixels is counted for each of the inspection candidate areas generated in Step S404.

FIGS. 14A and 14B are diagrams for explaining a method for counting the number of edge pixels in Step S405. When doing this process, the CPU 301 first uses, for example, a Laplacian filter 900 to perform a filtering process (edge emphasis) on the input image data 801 on a pixel basis, and acquires image data in which as illustrated in FIG. 14A, only edge portions of the input image data are extracted. In FIG. 14A, edge pixels are indicated in black, and non-edge pixels are indicated in white. After that, the CPU 301 counts the number of edge pixels for each of the inspection candidate areas.

Given here that the positions of the multiple inspection candidate areas in the X direction and in the Y direction are respectively represented by i (i=1 to 5) and j (j=1 to 4), and the number of edge pixels included in each of the inspection candidate areas is represented by R(i, j), in the case of FIG. 14A, R(1, 1)=0, R(1, 2)=0, R(1, 3)=0, R(1, 4)=0,
R(2, 1)=0, R(2, 2)=6, R(2, 3)=12, R(2, 4)=4,
R(3, 1)=9, R(3, 2)=16, R(3, 3)=14, R(3, 4)=0,
R(4, 1)=0, R(4, 2)=6, R(4, 3)=12, R(4, 4)=4,
R(5, 1)=0, R(5, 2)=0, R(5, 3)=0, and R(5, 4)=0.

When the number of edge pixels in each of the inspection candidate areas is obtained, the flow proceeds to Step S406, where the CPU 301 sets some inspection target areas from among the multiple inspection candidate areas on the basis of the numbers of edge pixels obtained. In the present embodiment, among the 20 inspection candidate areas, one area having the smallest number of edge pixels is selected from each of the columns in the X direction (i=1 to 5) to set five inspection target areas in total.

For example, in the case of the first column (i=1), all of R(1, 1) to R(1, 4) are zero. Accordingly, one of the inspection candidate areas corresponding to R(1, 1) to R(1, 4) is set as an inspection target area. It is here assumed that the inspection candidate area at (i=1, j=1) is set as an inspection target area.

In the case of the second column (i=2), R(2, 1)=0 is the smallest. Accordingly, the inspection candidate area at (i=2, j=1) is set as an inspection target area. In the case of the third column (i=3), R(3, 4)=0 is the smallest. Accordingly, the inspection candidate area at (i=3, j=4) is set as an inspection target area. In the case of the fourth column (i=4), R(4, 1)=0 is the smallest. Accordingly, the inspection candidate area at (i=4, j=1) is set as an inspection target area. In the case of the fifth column (i=5), all of R(5, 1) to R(5, 4) are zero. Accordingly, one of the inspection candidate areas corresponding to R(5, 1) to R(5, 4) is set as an inspection target area. It is here assumed that the inspection candidate area at (i=5, j=1) is set as an inspection target area.

From the above, in this example, the five inspection candidate areas at (i=1, j=1), (i=2, j=1), (i=3, j=4), (i=4, j=1), and (i=5, j=1) are set as the inspection target areas. FIG. 14B is a diagram in which the inspection target areas set for the edge pixel extracted image illustrated in FIG. 14A are indicated by thick lines. The inspection target area setting algorithm ends here.

Next, a division size and phase suitable for each of the inspection target areas set in Step S5 of FIG. 5 will be described. FIGS. 15A and 15B are diagrams for explaining a division size suitable for an inspection target area. Each of the diagrams illustrates a result of performing the averaging process (S13) and quantization process (S14) described with FIG. 6 on an inspection target area 1901 including both at least one white line image 1802 and a white stripe 1803 desired to be extracted as a unique portion.

As has been described with FIGS. 10A to 10C, when too many white line images 1802 are included in one of division areas each serving as the unit of the averaging process, it becomes difficult to make clear the difference from division areas including the white stripe 1803 in a result of the averaging process. Accordingly, in the present embodiment, when a relatively large number of white line images 1802 are included as in FIG. 15A, it is adapted to decrease the size of a division area indicated by a thick line to prevent many white line images from being included in each division area. On the other hand, when only a small number of white line images 1802 are included as in FIG. 15B, it is adapted to make the size of a division area relatively large to reduce a processing load. As seen in FIGS. 15A and 15B, in any case, by performing the quantization process, an appropriate position where the white stripe is actually present can be extracted.

The present embodiment is adapted not to actually detect the white line image 1802 but to set a division size using a count value R(i, j) of edge pixels included in each inspection target area. That is, it is adapted to, in the case of an inspection target area having a relatively large number of edge pixels, set a small division size, and in the case of an inspection target area having a relatively small number of edge pixels, set a large division size. For example, it is only necessary to, in a memory, preliminarily store a table in which the numbers of edge pixels and division sizes are respectively related to each other, and refer to the table in Step S5 of FIG. 5 to set a division size on the basis of the numbers of edge pixels obtained when inspection target areas were set in Step S4.

On the other hand, FIGS. 16A and 16B are diagrams for explaining a phase suitable for an inspection target area. Each of the diagrams illustrates a state where an inspection target area 1901 including both at least one white line image 1802 and a white stripe 1803 desired to be extracted as a unique portion is divided by a predetermined division size and a result of performing the quantization process (S14) on the inspection target area 1901.

When performing the addition process of multiple results obtained while changing a phase with a division size fixed as in the present embodiment, as a movement distance from a reference position indicated by a solid line increases, the effect of more white line images 1802 is given. As a result, it becomes difficult to make clear the difference from a pixel actually including the white stripe 1803. Accordingly, in the present embodiment, when a relatively large number of white line images 1802 are included as in FIG. 16A, the size of a phase (movement distance range) is decreased to keep a range of images affecting addition image data as small as possible. On the other hand, when only a small number of white line images 1802 are included as in FIG. 16B, the size of a phase (movement distance range) is increased to increase a range of images affecting addition image data, thus resulting in a reduction in noise.

The present embodiment is also adapted to set such a phase using a count value R(i, j) of edge pixels, as with a division size. That is, even in the case of the same division size, it is adapted to, in the case of an inspection target area having a relatively large number of edge pixels, set a small movement distance (phase size), and in the case of an inspection target area having a relatively small number of edge pixels, set a large movement distance (phase size). For example, it is only necessary to, in a memory, preliminarily store a table in which the numbers of edge pixels, and sets of a division size and a corresponding phase are related to each other, and refer to the table in Step S5 of FIG. 5 to set an appropriate division size and phase on the basis of the numbers of edge pixels obtained when inspection target areas were set in Step S4. Note that when there is a concern that storing division sizes and corresponding phases in relation to all the numbers of edge pixels increases a memory size, it may be adapted to store division sizes and phases related to some of all the numbers of edge pixels, and use a publicly known interpolation operation such as linear interpolation to obtain a division size and a phase.

The present embodiment described above is adapted to, even when setting an actual image as an inspection target, generate inspection target image data suppressing the effect of the actual image as well as setting image area allowing a concerned unique portion to be surely extracted as inspection target areas. This makes it possible to efficiently extract the unique portion while keeping a processing load as low as possible.

Second Embodiment

In the first embodiment, as described with the flowchart illustrated in FIG. 6, the process adapted to obtain an addition result of average values for multiple phases corresponding to a predetermined division size is performed. Meanwhile, as described using FIGS. 8A to 9J, such a process finally results in a filtering process performed around a target pixel. In consideration of such a respect, the present embodiment is adapted to replace the addition process for multiple phases corresponding to a uniform division size by an addition process of weighting coefficients using a Gaussian filter.

Figure 17A:
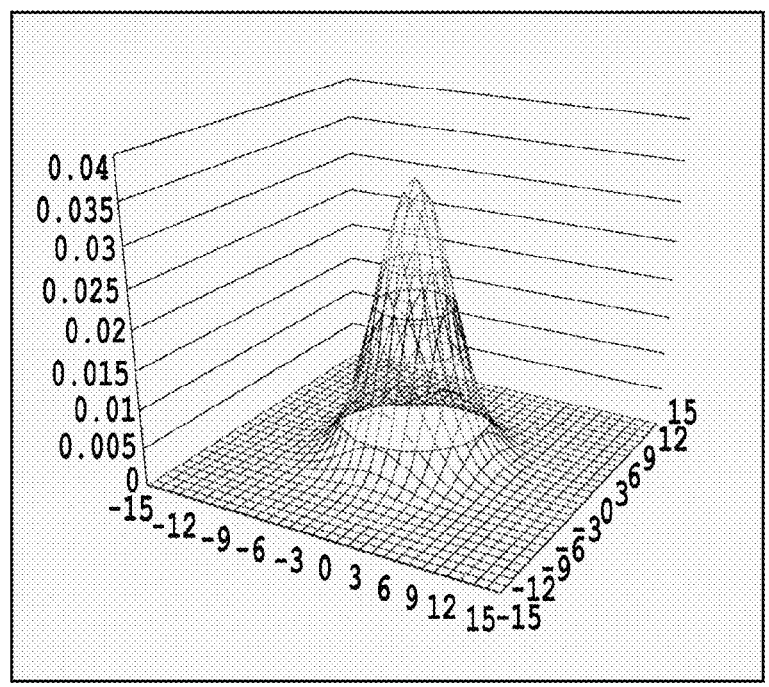
FIGS. 17A and 17B are diagrams illustrating examples of a Gaussian filter.
Figure 17B:
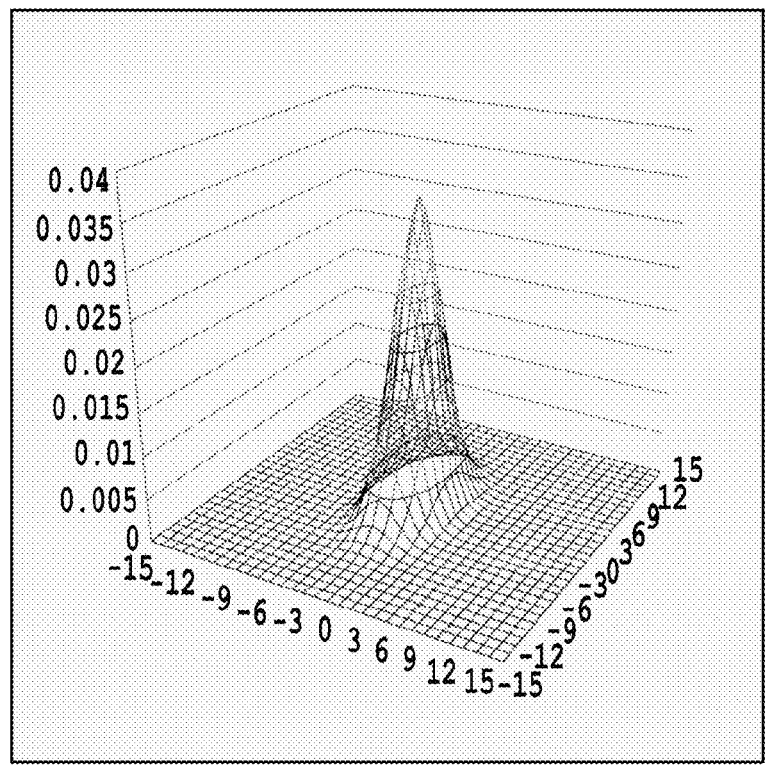

FIGS. 17A and 17B are diagrams illustrating examples of a Gaussian filter. FIG. 17A illustrates an isotropic Gaussian filter, which can be expressed by Expression 2.

$$f(x, y) = \frac{1}{2\pi\sigma^2}\exp\left(-\frac{x^2+y^2}{2\sigma^2}\right) \quad \text{Expression 2}$$

Here, σ represents a standard deviation.

Such an isotropic Gaussian filter corresponds to, in the first embodiment, the case of using a square division size such as 2×2 or 3×3. On the other hand, FIG. 17B illustrates an anisotropic Gaussian filter, and corresponds to, in the first embodiment, the case of using a rectangular division size such as 2×3. Such an anisotropic Gaussian filter can be generated by deviating the ratio between x and y in Expression 2. For example, FIG. 17B corresponds to a Gaussian filter generated by replacing x in Expression 2 by x'=X/2. The present embodiment can employ any of the Gaussian filters. However, in the following, the description will be continued while taking the case of imitating the isotropic Gaussian filter illustrated in FIG. 17A as an example.

The Gaussian filter in FIG. 17A represents coefficients of respective pixels positioned within the ranges of $-15 \leq X \leq 15$ and $-15 \leq Y \leq 15$ with a target pixel positioned at the origin and σ=3. A form adapted to set the coefficients within the ranges of $-15 \leq X \leq 15$ and $-15 \leq Y \leq 15$ as described is similar to, in the first embodiment, a state where a division size is set to 8×8, and the addition process as illustrated in FIGS. 8A to 9J is performed. That is, given that the size (diameter) of a Gaussian filter is represented by F, and a division size in the first embodiment is represented by V×V, the size F can be represented as F≈2V−1. In addition, by adjusting the Gaussian filter size F as well as the standard deviation σ, various Gaussian filters can be prepared. The present embodiment is adapted to obtain a result of using one Gaussian filter to perform a filtering process on luminance data of a target pixel, and further performing quantization for each of multiple different Gaussian filters, and add the resulting results. In doing so, a unique portion extracting process can be performed on the basis of the addition result equivalent to that in the first embodiment.

Figure 18:
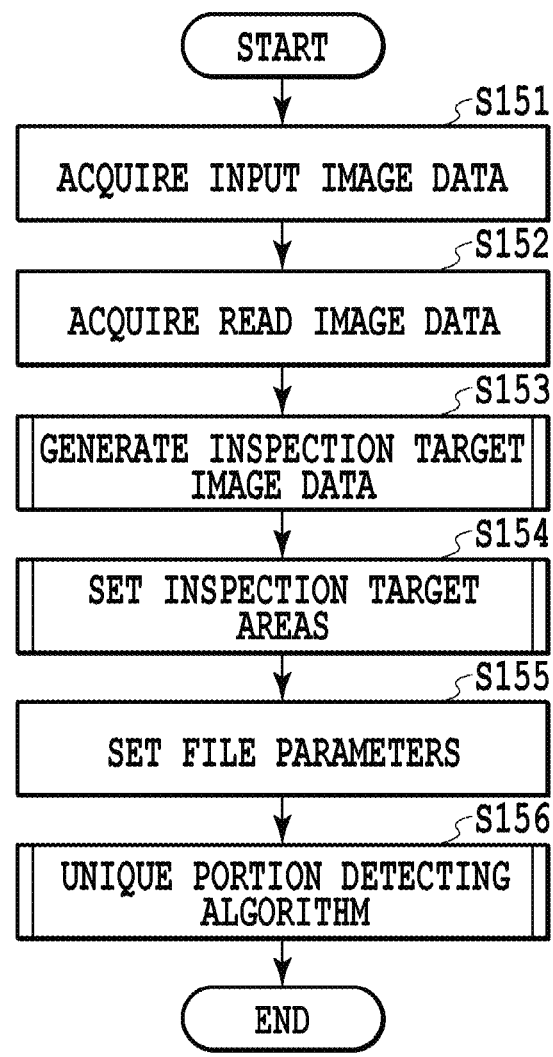
FIG. 18 is a flowchart illustrating the basic steps for unique portion detection in a second embodiment.

In the present embodiment as well, the image processing apparatus 1 can take various forms as described with FIGS. 1A to 1D. FIG. 18 is a basic flowchart of a unique portion detecting algorithm performed by the image processing apparatus 1 of the present embodiment. When this process is started, the image processing apparatus 1 acquires input image data in Step S151, and in subsequent Step S152, acquires read image data. Further, in Step S153, the image processing apparatus 1 generates inspection target image data, and in Step S154, sets inspection target areas. Steps S151 to S154 described above are the same steps as Steps S1 to S4 in FIG. 5. Note that when generating the inspection target image data in Step S153, Fp and Fq defining the size of dummy data are given as Fp=INT (Fx/2), and Fq=INT (Fy/2). Here, Fx and Fy respectively represent X and Y components of the maximum gauss filter size F used in the unique portion detecting algorithm.

In Step S155, for each of the inspection target areas, the CPU 301 sets multiple different file parameters of a Gaussian filter used for the unique portion detecting algorithm to be performed in subsequent Step S156. The file parameters refer to parameters for designating the directionality of a Gaussian function as described with FIG. 17A or 17B, and a different filter size F or σ. Then, in Step S156, on the basis of the file parameters set in Step S155, the predetermined unique portion detecting algorithm is performed on the inspection target areas set in Step S154.

Figure 19:
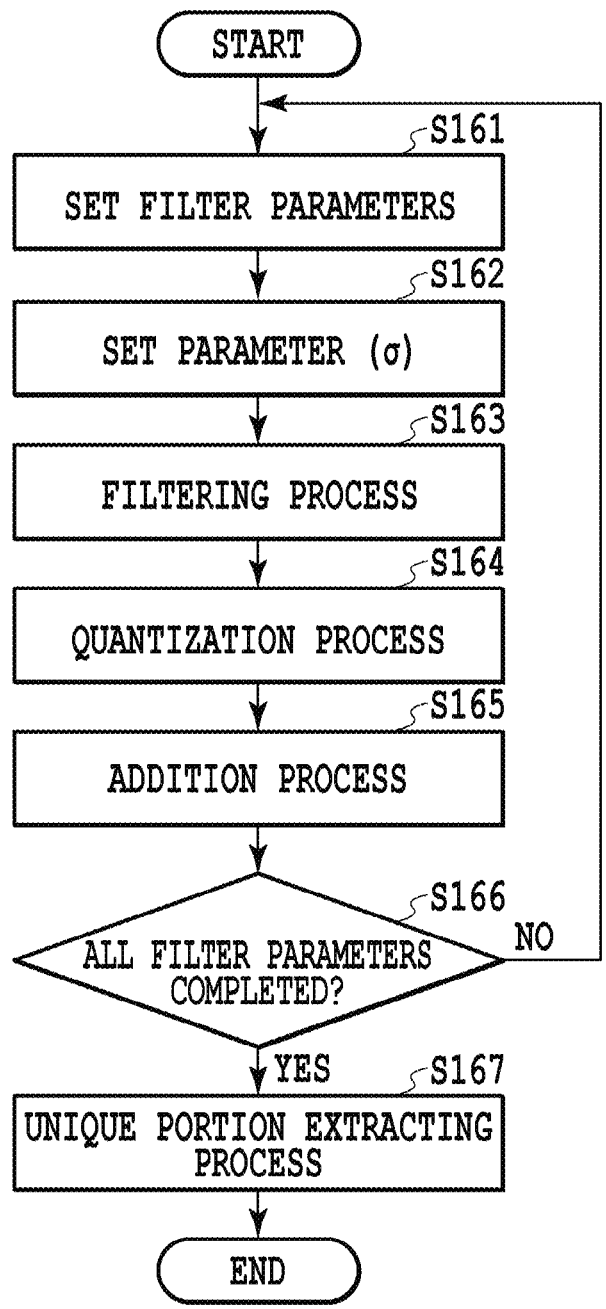
FIG. 19 is a flowchart illustrating a unique portion detecting algorithm in the second embodiment.

FIG. 19 is a flowchart for explaining the steps of the unique portion detecting algorithm performed by the CPU 301 in Step S156. The process illustrated in FIG. 19 is performed one-by-one on pixels included in each of the inspection target areas set in Step S154.

When this process is started, in Step S161, the CPU 301 first sets one file parameter from among the multiple file parameters set in Step S155. Further, in Step S162, the CPU 301 sets a parameter σ corresponding to the file parameter set in Step S161. The parameter σ corresponds to the standard deviation of σ Gaussian function, and is assumed to be preliminarily stored in a memory related to the file parameter and a filter size. Setting the file parameter and the parameter σ in Steps S161 and S162 determines the shape of a Gaussian filter.

In subsequent Step S163, the Gaussian filter set in Steps S161 and S162 is used to perform a filtering process on a target pixel in each of the inspection target areas set in Step S154. Specifically, pieces of luminance data of the target pixel and peripheral pixels falling within the filter size F are multiplied by a coefficient determined by the Gaussian filter, and the sum of the pieces of luminance data multiplied by the coefficients are calculated as a filtering process value for the target pixel.

In Step S164, a quantization process is performed on the filtering process value obtained in Step S163, and further, in Step S165, a quantized value obtained in Step S164 is added to addition image data. The addition image data refers to image data for obtaining a result of adding pieces of quantized data obtained while variously changing the file parameter, i.e., variously changing the type of a Gaussian filter. When the quantized data obtained in Step S164 is a result for the initial Gaussian filter, the addition image data is the same as the quantized data obtained in Step S164.

In subsequent Step S166, the image processing apparatus 1 determines whether or not all the file parameters set in Step S153 have been processed. When the image processing apparatus 1 determines that a file parameter to be processed still remains, the flow returns to Step S161, where the next file parameter is set. On the other hand, when the image processing apparatus 1 determines that all the file parameters have been processed, the flow proceeds to Step S167.

In Step S167, on the basis of currently obtained addition image data, the unique portion extracting process is performed. An extracting method is not particularly limited as in the first embodiment. This process ends here.

As with the first embodiment, the present embodiment is also adapted to avoid the effect of input image data as much as possible while surely extracting a white stripe. For this purpose, in Step S155, file parameters to be set are limited for each of the inspection target areas. That is, for an inspection target area including a relatively large number of white line images at high density, the filter size F is decreased to keep a range of images affecting addition image data as small as possible. On the other hand, for including only a small number of white line images, the filter size F is increased to reduce noise.

Figure 20C:
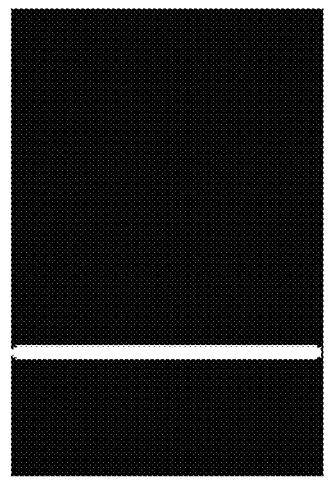
FIGS. 20A to 20C are diagrams illustrating a processing result the unique portion detecting algorithm.
Figure 20B:
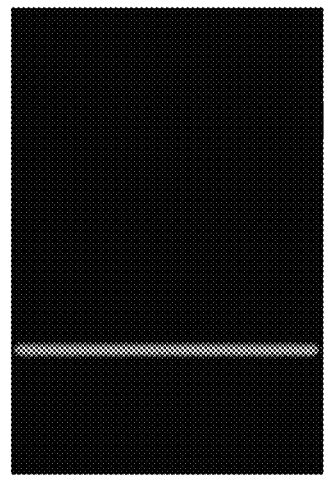
Figure 20A:
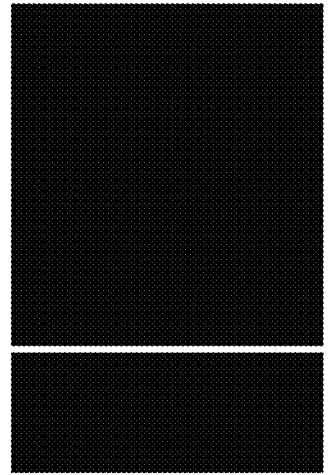

FIGS. 20A to 20C are diagrams for explaining a result of performing the unique portion detecting algorithm in the present embodiment on a set inspection target areas. FIG. 20A illustrates the one inspection target area set in Step S154 among the inspection target image data generated in Step S153 of FIG. 18. A white strip caused by ejection failure appears in a uniform image from which the effect of input image data is removed.

FIG. 20B illustrates a result of processing the inspection target image illustrated in FIG. 2 0A using a Gaussian filter having filter sizes Fx=Fy=30 and a standard deviation σ=3. It turns out that the entire image including the white stripe is blurred. Further, FIG. 20C illustrates a result of performing the flowchart described with FIG. 19. Specifically, FIG. 20C illustrates a result of, in Step S165, adding results obtained when setting σ=1, 2, and 3 in Step S161, and in Step S 167, binarizing a result of the addition. It turns out that a place where the white stripe appears in FIG. 20A is further emphasized and appropriately extracted.

As described above, in the present embodiment using a Gaussian filter as well as in the first embodiment, a unique portion can be effectively extracted.

Note that in the above, it is adapted to, even when ejection failure occurs in any of printing elements arrayed in the X direction, in order to make it possible to surely extract that printing element, set an inspection target image so as to cover the entire image area in the X direction, i.e., so as to make the ratio of an area occupied by inspection target areas in the X direction equal to 100%. On the other hand, in the Y direction, in order to reduce a processing load, it is adapted to select only partial areas. For this reason, in Step S4 of FIG. 5 or Step S154 of FIG. 18, as seen in FIG. 14B, one area having the smallest number of edge pixels is selected from each of the columns (i=1 to 5) in the X direction.

However, the above-described embodiment is not limited to such a form. As long as the effect of being able to more surely extracts a white stripe extending in the Y direction than the other unique portions can be obtained, the inspection target areas can be selected in various manners. For example, as described in the first embodiment, even in the case of selecting inspection target areas from among multiple inspection candidate areas, it is also possible to select multiple inspection target areas from each of the columns i=1 to 5 in the X direction to the extent that an increase in processing load does not cause a problem.

Further, from the viewpoint of giving priority to the extraction of a white stripe extending in the Y direction over the extraction of the other unique portions while keeping the number of inspection target areas as small as possible, it is only necessary that the ratio of an area occupied by inspection target areas in the X direction is higher than that in the Y direction. That is, given that the numbers of pixels in the X and Y directions in input image data are represented by M and N, respectively, and the numbers of pixels in the X and Y direction included in inspection target areas are represented by m and n, respectively, as long as Expression 3 is satisfied, the effect of the above-described embodiment can be obtained.

$$m/M > n/N \qquad \text{Expression 3}$$

Figure 21:
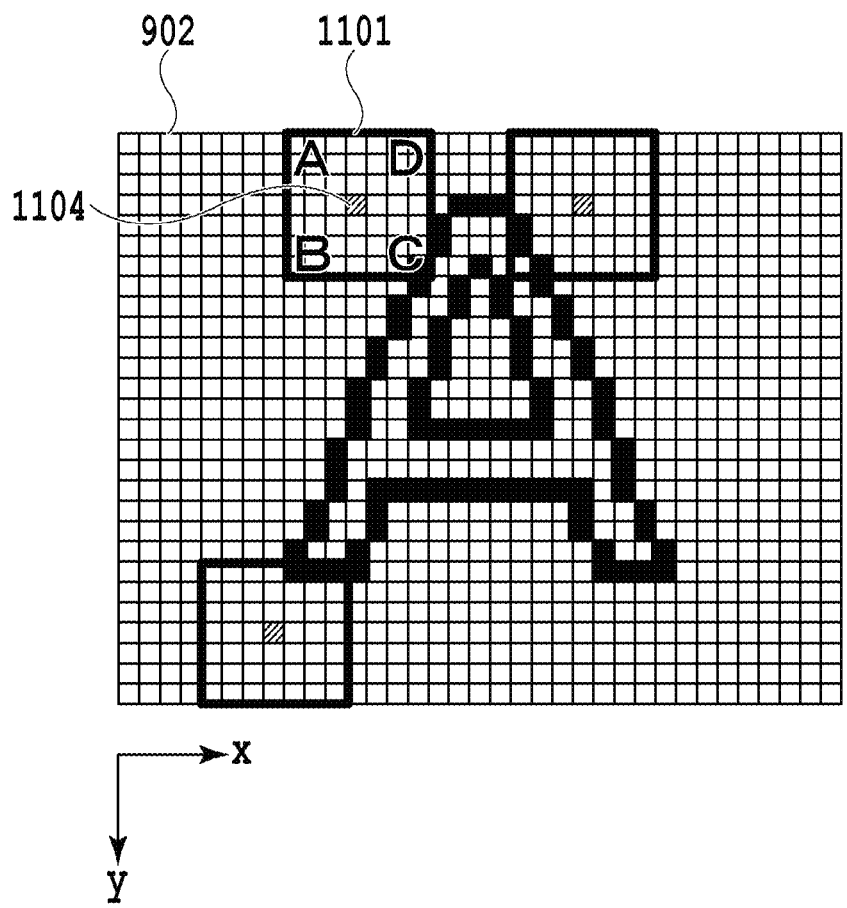
FIG. 21 is a diagram for explaining a method for setting inspection target areas.

When doing this, in order to make the ratio of an area occupied by inspection target areas in the X direction larger than that in the Y direction, it is also possible to use the coordinates of the gravity center or a side of each inspection candidate area. In the case of using the coordinates of the gravity center, referring to FIG. 21, the coordinates of the gravity center 1104 of each inspection candidate area 1101 can be obtained from the coordinates of the four apices ABCD. In this example, since the inspection candidate area 1101 is square-shaped, the gravity center coordinates can be obtained from the intersection point between the line segments AC and BD. Eventually, it is only necessary to compare multiple sets of the resulting gravity center coordinates with one another, and as inspection target areas, set inspection candidate areas of which the X coordinates are as different as possible.

Alternatively, in the case of using the coordinates of a side, from the coordinates of the four apices ABCD of each inspection candidate area 1101, an X-coordinate of a side parallel to the Y axis (the X coordinate of the side AB or CD) is obtained. Eventually, it is only necessary to compare the resulting multiple X coordinates with one another, and as inspection target areas, set inspection candidate areas of which the X coordinates are as different as possible.

Further, in the above, as in FIG. 12A, the case where the image having the black character "A" laid out in the uniform gray halftone image is the input image data 801 is taken as an example to give the description; however, the input image data is of course not only such a pattern. For example, in the case of not a halftone image but a white image, since no ink is applied on the white area, a white stripe as illustrated in FIG. 12B does not occur, and therefore ejection failure cannot be found.

Figure 22:
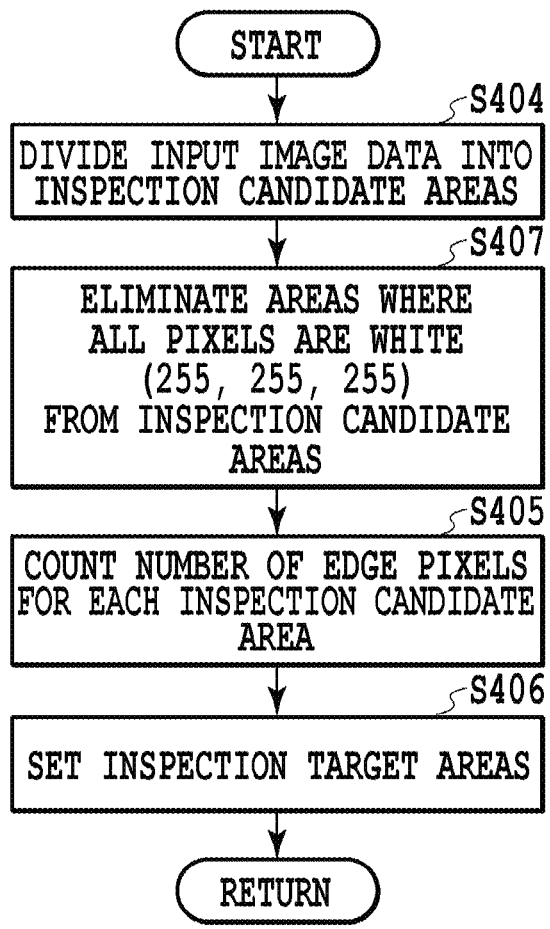
FIG. 22 is a flowchart illustrating an inspection target area setting process performed when a white image is included.

FIG. 22 is a flowchart for explaining the inspection target area setting algorithm performed by the CPU 301 in Step S4 of FIG. 5 or Step S154 of FIG. 18 when input image data includes white data. As compared with already described FIG. 13B, it turns out that Step S407 is added.

When this process is started, in Step S404, the CPU 301 first divides the input image data 801 into multiple inspection candidate areas. Then, in Step S407, from among the multiple inspection candidate areas, areas where a predetermined number or more of pixels are white pixels, i.e., areas where a predetermined number or more of pixels having a signal value of RGB=(255, 255, 255) are present are eliminated.

Subsequently, in Step S405, the number of edge pixels is counted for each of inspection candidate areas left in Step S407. Further, in Step S406, on the basis of the numbers of edge pixels obtained, some inspection target areas are set from among the multiple inspection candidate areas using any of the above-described methods. In doing so, even when the input image data includes a certain amount of white images, an area including a relatively large number of white images can be avoided from being set as an inspection target area, and therefore a white stripe can be surely extracted.

Third Embodiment

In the present embodiment, a method for accurately extracting an ejection failure point on an ink color basis. In any of the above-described embodiments, as illustrated in FIG. 12A, the input image data in which the black character "A" is laid out in the halftone image is taken as an example to give the description. However, when a black ink is not used for a halftone image, black ink ejection failure does not appear as a white stripe as indicated by 801, and therefore cannot be detected. For this reason, in the present embodiment, in Step S4 of FIG. 5 or Step S154 of FIG. 18, inspection target areas are set in consideration of ink color types used in addition to the numbers of edge images.

Figure 23:
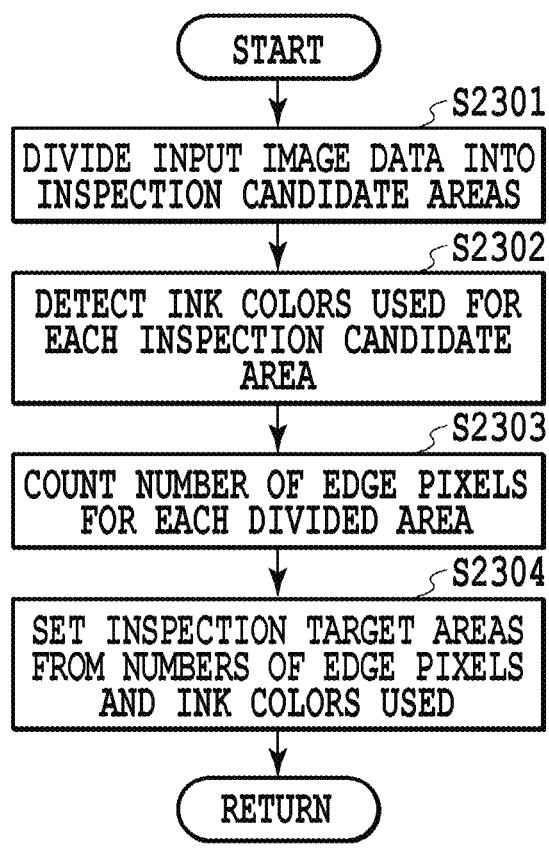
FIG. 23 is a flowchart for explaining an inspection target area setting algorithm.

FIG. 23 is a flowchart for explaining an inspection target area setting algorithm performed by the CPU 301 in the present embodiment. When this process is started, in Step S2301, the CPU 301 first divides input image data 801 into multiple inspection candidate areas. In subsequent Step S2302, the CPU 301 detects ink colors used for printing for each of the inspection candidate areas generated in Step S2301. That is, it is determined whether or not each of black (K), cyan (C), magenta (M), and yellow (y) is used in each of the inspection candidate areas. When doing this, pieces of black (K), cyan (C), magenta (M), and yellow (Y) print data on each pixel can be derived from the input image data (RGB) on that pixel.

Figure 24:
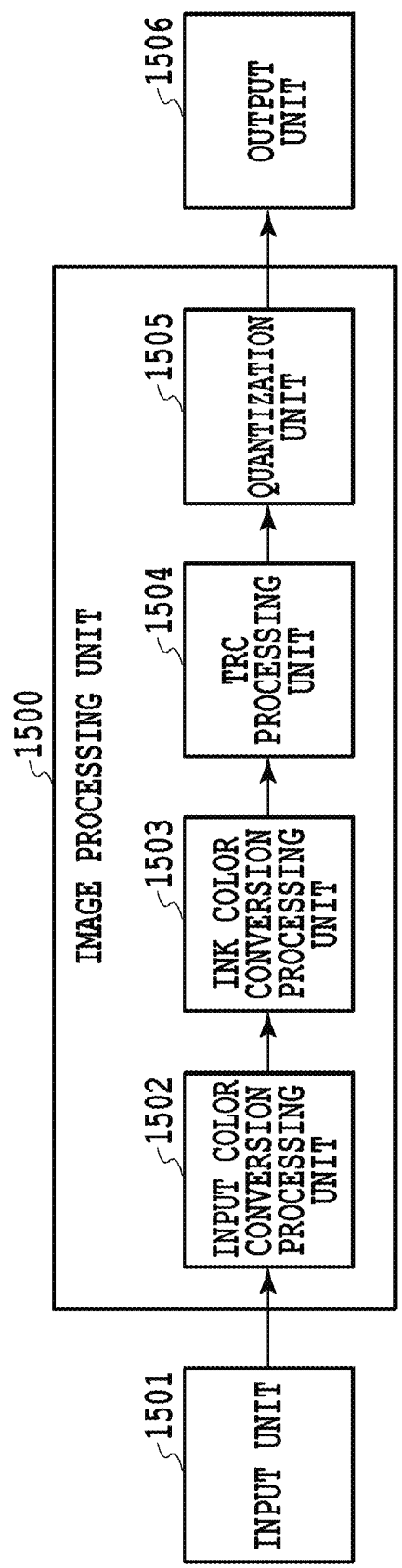
FIG. 24 is a block diagram for explaining a typical image process.

FIG. 24 is a block diagram for explaining a typical image process performed on input image data in order for the CPU 301 of the image processing apparatus 1 to generate pieces of print data printable by the print head 100. Each block illustrated in the diagram represents a processing function performed by the CPU 301, but is not limited to any hardware configuration. In the following, the image process will be sequentially described in accordance with the diagram.

Input image data received by an input unit 1501 is a set of pieces of color coordinate data in the color space of a monitor, such as sRGB. An input color conversion processing unit 1502 performs a process for mapping from such a color space of the monitor to a color space expressible by the printing apparatus. Specifically, the input color conversion processing unit 1502 refers to a preliminarily stored three-dimensional lookup table to convert the set of pieces of RGB multivalued data to another set of pieces of RGB multivalued data.

An ink color conversion processing unit 1503 converts the pieces of RGB multivalued data outputted from the input color conversion processing unit 1502 to pieces of multivalued density data corresponding to ink colors to be used by the printing apparatus. Specifically, the ink color conversion processing unit 1503 refers to a preliminarily stored three-dimensional lookup table to convert the pieces of RGB multivalued data to pieces of CMYK multivalued data.

A TRC processing unit 1504 performs a conversion process for allowing the densities of respective colors expressed on a sheet to respectively obtain a linear relationship with corresponding ones of the pieces of CMYK multivalued data. Specifically, the TRC processing unit 1504 uses a one-dimensional lookup table prepared for each of the pieces of CMYK multivalued data, and converts the pieces of CMYK multivalued data to also pieces of CMYK multivalued data.

A quantization processing unit 1505 performs a quantization process on each of the pieces of CMYK multivalued data outputted from the TRC processing unit to determine printing (1) or non-printing (2) of a dot of a corresponding ink color for each pixel. As a method for the quantization process, a known method such as a dither method or an error diffusion method can be employed. The pieces of print data outputted from the quantization processing unit 1505 are transferred from the data transfer I/F 304 to the multifunction peripheral 6 through an output unit 1506.

After such a series of image processing, on the basis of the pieces of print data outputted from the quantization processing unit 1505, CPU 301 can confirm ink colors to be used in each inspection candidate area. Then, in Step S2303 of FIG. 23, the number of edge pixels is counted for each of the inspection candidate areas generated in Step S2301.

It is here assumed that for example, in the third column (i=3) of the input image data illustrated in FIG. 14A, the following results are obtained in Step S2302 and S2303 described above.

Inspection candidate area (3, 1), The number of edge pixels R(3, 1)=9, Ink colors used: CMYK
Inspection candidate area (3, 2), The number of edge pixels R(3, 2)=16, Ink colors used: CMYK
Inspection candidate area (3, 3), The number of edge pixels R(3, 3)=14, Ink colors used: CMYK
Inspection candidate area (3, 4), The number of edge pixels R(3, 4)=0, Ink colors used: CMY In this case, in the first and second embodiments, since R(3, 4)=0 is the smallest, the inspection candidate area at (i=3, j=4) is set as an inspection target area. However, when focusing on ink colors used, in the inspection candidate area at (i=3, j=4), the black ink is not used. That is, even when black ejection failure occurs, the failure cannot be detected in that area. For this reason, in Step S2304 in the present embodiment, from among inspection candidate areas where all the ink colors are used, an inspection candidate area where the number of edge pixels is the smallest is selected and set as an inspection target area. For this reason, among the above four candidate areas, the inspection candidate area corresponding to R(3, 1)=9 is set as an inspection target area in the third column (i=3).

According to the present embodiment as described, even when ejection failure occurs in any of the ink colors, the ejection failure can be accurately extracted.

Other Embodiments

In the above-described embodiments, as an example of the form in which an image printed by the multifunction peripheral 6 is read by the same multifunction peripheral, the full-line type inkjet printing apparatus illustrated in FIG. 3 is used. However, as the multifunction peripheral 6, a serial type inkjet printing apparatus as illustrated in FIGS. 25A and 25B can also be employed.

Figure 25A:
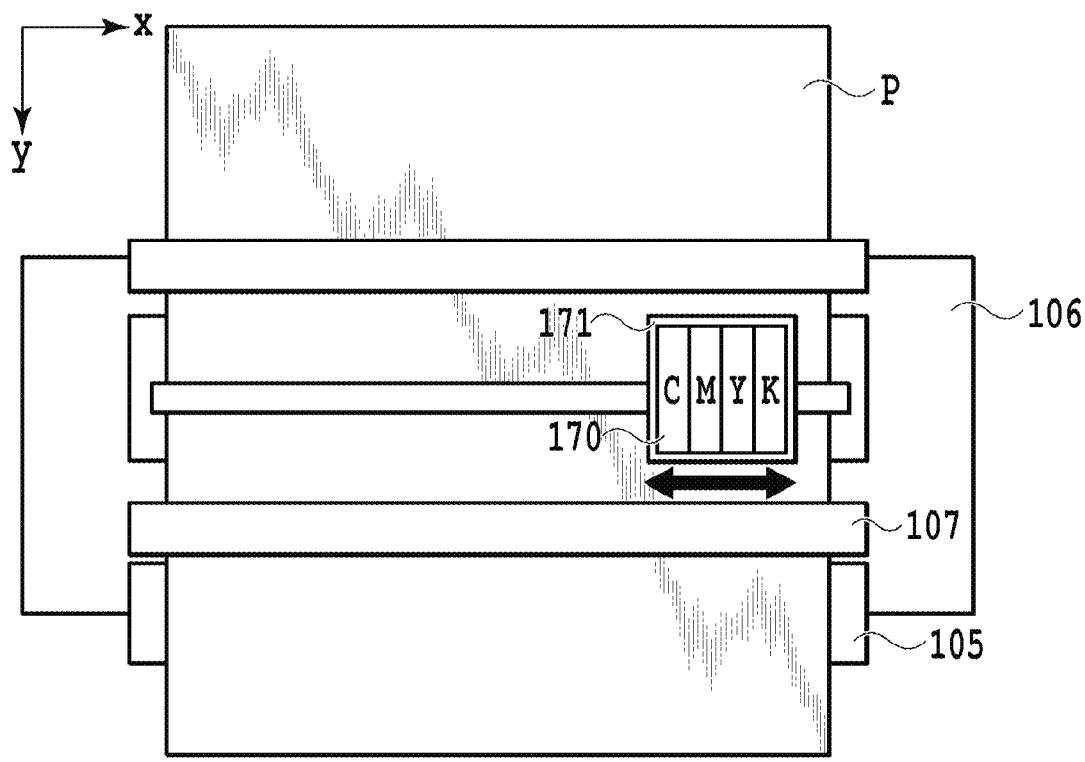
FIGS. 25A and 25B are diagrams for explaining a serial type inkjet printing apparatus.

In FIG. 25A, a print head 170 makes reciprocating movement in an X direction in the diagram in a state of being mounted on a carriage 171, and during the movement, from four printing element arrays, black (K), cyan (c), magenta (M), and yellow (Y) inks are respectively ejected. After the end of one print scan, a sheet P is conveyed in a Y direction by a distance corresponding to the print width of the print head 170. By alternately repeating such a print scan and conveyance action, an image is formed on the sheet P. On the other hand, a read head 107 is configured to include multiple reading elements arrayed in the X direction as in FIG. 3.

Figure 25B:
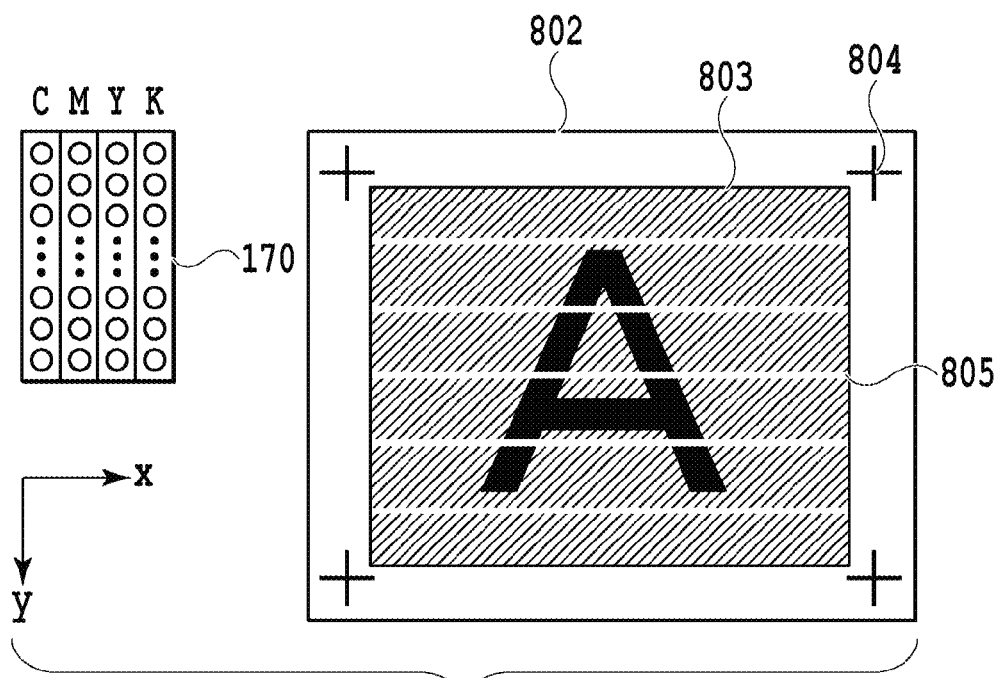

When a printing element causing ejection failure occurs in the serial type inkjet printing apparatus as in FIG. 25A, white stripes extend in the X direction as illustrated in FIG. 25B. For this reason, in Step S4 of FIG. 5, inspection target areas are set so as to give priority to extracting the white stripes extending in the X direction. For example, given that the numbers of pixels in input image data in the X and Y directions are represented by M and N, respectively, and the numbers of pixels included in the inspection target areas are represented by m and n, respectively, it is adapted to satisfy Expression 4.

$$m/M < n/N \qquad \text{Expression 4}$$

Meanwhile, in the above, the case of giving priority to extracting the white stripes caused by the ejection failure of a printing element is described; however, the present invention is not limited to such a form. As long as a form is one attempting to extract a unique portion extending in a predetermined direction, a cause of the occurrence of the unique portion is not particularly limited. For example, when foreign matter is attached to a conveyance roller adapted to convey a sheet P, a conveyance flaw extending in the Y direction may occur in an output image, and the present invention can also extract such a flaw together with white stripes. Note that in the case of the full-line type printing apparatus as in FIG. 3, a conveyance flaw extends in the same Y direction as an extending direction of a white stripe; however, in the case of the serial type printing apparatus as in FIGS. 25A and 25B, a conveyance flaw appears in a direction intersecting with an extending direction of white stripes. In the case of the latter, when setting the entire area as an inspection target area so as to prevent the omission of inspection both in the X and Y directions, a processing load becomes large.

In such a case, when setting inspection target areas in Step S4 of FIG. 5 or Step S15 of FIG. 18, it is only necessary to separately prepare inspection target areas for white stripe detection and inspection target areas for conveyance flaw detection. That is, for the white stripe detection, inspection target areas are set so as to cover the entire image area in the Y direction, and for the conveyance flaw detection, inspection target are set so as to cover the entire image area in the X direction. For example, in the case of FIGS. 14A and 14B, for the white stripe detection, four inspection target areas respectively having different Y coordinates are set, whereas for the conveyance flaw detection, five inspection target areas respectively having different X coordinates are set. Then, by performing the unique portion detecting algorithm on each of the inspection target areas, a processing load can be kept sufficiently lower than performing the unique portion algorithm on the entire area. As described, in the present invention, as long as a unique portion desired to be extracted has a feature of extending in a predetermined direction, regardless of whether the direction is the X direction or the Y direction, and regardless of what causes the unique portion, the unique portion can be surely and efficiently extracted.

In addition, in each of the above-described embodiments, the input image data acquired in Step S1 of FIG. 5 or Step S151 of FIG. 18 is assumed to be RGB multivalued data to give the description; however, the input image data can be assumed to be CMYK data. In this case, it is only necessary to, when generating inspection target image data in Step S3 of FIG. 5 or Step S153 of FIG. 18, convert the CMYK data to RGB data using an ICC profile and then perform the process as described with FIG. 13A.

Further, embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2015-132856, filed Jul. 1, 2015, which is hereby incorporated by reference wherein in its entirety.

What is claimed is:

1. An image processing apparatus adapted to detect a unique portion extending in a predetermined direction from a printed image, the image processing apparatus comprising:
a generating unit configured to generate inspection target image data on a basis of read image data resulting from reading the image;
a setting unit configured to set inspection target areas in the inspection target image data; and
an extracting unit configured to perform an image processing for extracting the unique portion of the inspection target areas set by the setting unit, wherein
the setting unit sets the inspection target areas so as to make a ratio of a range occupied by inspection target areas to an entire image area of the inspection target image data in a direction intersecting with the predetermined direction larger than a ratio of a range occupied by inspection target areas to the entire image area in the predetermined direction.

2. The image processing apparatus according to claim 1, wherein
the setting unit sets the inspection target areas so as to make the ratio of a range occupied by the inspection target areas to the entire image area of the inspection target image data in the direction intersecting with predetermined direction equal to 100%.

3. The image processing apparatus according to claim 1, wherein
the setting unit:
generates multiple inspection candidate areas from input image data used to print the image;
counts the number of edge pixels corresponding to edge portions of the image for each of the multiple inspection candidate areas on a basis of the input image data; and
as the inspection target areas, preferentially sets areas corresponding to inspection candidate areas where the number of edge pixels is relatively small.

4. The image processing apparatus according to claim 3, wherein
the setting unit:
counts the number of pixels each corresponding to white data for each of the multiple inspection candidate areas on the basis of the input image data; and
as the inspection target areas, preferentially sets areas corresponding to inspection candidate areas where the number of pixels each corresponding to white data is relatively small.

5. The image processing apparatus according to claim 3, wherein
the setting unit:
on the basis of the input image data, for each of the multiple inspection candidate areas, determines types of ink colors used to print the image; and
as the inspection target areas, does not set areas corresponding to inspection candidate areas where it is not determined that all ink colors have been used for the printing.

6. The image processing apparatus according to claim 1, wherein
the extracting unit:
performs an averaging process and a quantization process on each of division areas obtained by dividing the inspection target areas by a predetermined division size;
adds values obtained by the quantization process performed on division areas obtained by dividing the inspection target areas by the predetermined division size while changing a phase; and
extracts the unique portion on a basis of a result of further adding results of that addition performed while changing the predetermined division size.

7. The image processing apparatus according to claim 6, wherein
the extracting unit sets the predetermined division size and the phase independently for each of the inspection target areas.

8. The image processing apparatus according to claim 1, wherein
the extracting unit:
performs a filtering process using a predetermined filter size and a quantization process on the inspection target areas; and
extracts the unique portion on a basis of a result of adding values obtained by the quantization process performed while changing a parameter of the filtering process.

9. The image processing apparatus according to claim 8, wherein
the extracting unit sets the parameter of the filtering process independently for each of the inspection target areas.

10. The image processing apparatus according to claim 1, wherein
the generating unit generates the inspection target image data on a basis of input image data used to print the image and the read data.

11. The image processing apparatus according to claim 10, wherein
the generating unit generates the inspection target image data from a difference between the input image data and the read image data.

12. The image processing apparatus according to claim 1, wherein
the setting unit makes the ratio of a range occupied by the inspection target areas in the predetermined direction larger than the ratio of a range occupied by the inspection target areas in the direction intersecting with the predetermined direction by setting the multiple inspection target areas so as to arrange gravity centers of the inspection target areas at different positions in the predetermined direction in the inspection target image data.

13. The image processing apparatus according to claim 1, wherein
the setting unit makes the ratio of a range occupied by the inspection target areas in the predetermined direction larger than the ratio of a range occupied by the inspection target areas in the direction intersecting with the predetermined direction by setting the multiple inspection target areas so as to arrange sides of the inspection target areas in different positions in the predetermined direction in the inspection target image data.

14. The image processing apparatus according to claim 1, wherein:
- the image is an image printed by an inkjet printing apparatus; and
- the unique portion is a white stripe that occurs due to ejection failure of a printing element in a print head of the inkjet printing apparatus and extends in the predetermined direction.

15. The image processing apparatus according to claim 1, wherein
- the extracting unit performs a popup process for making a place of the unique portion apparent.

16. The image processing apparatus according to claim 1, further comprising
- a unit configured to store a place of the unique portion extracted by the extracting unit and generate an image processing parameter for correcting the unique portion.

17. The image processing apparatus according to claim 1, further comprising:
- a printing unit configured to print the image; and
- a unit configured to perform a maintenance process on the printing unit depending on whether or not the unique portion extracted by the extracting unit is present.

18. The image processing apparatus according to claim 1, further comprising
- a determination unit configured to determine presence of the unique portion on a basis of information extracted by the extracting unit.

19. An image processing method adapted to detect a unique portion extending in a predetermined direction from a printed image, the image processing method comprising:
- a generating step of generating inspection target image data on a basis of read image data resulting from reading the image;
- a setting step of setting inspection target areas in the inspection target image data; and
- an extracting step of performing an image processing for extracting the unique portion of the inspection target areas set by the setting step,
- wherein the setting step sets the inspection target areas so as to make a ratio of a range occupied by inspection target areas to an entire image area of the inspection target image data in a direction intersecting with the predetermined direction larger than a ratio of a range occupied by inspection target areas to the entire image area in the predetermined direction.

20. A non-transitory computer readable storage medium that stores a program instructing a computer to perform an image processing method adapted to detect a unique portion extending in a predetermined direction from a printed image, wherein
the image processing method comprising:
- a generating step of generating inspection target image data on a basis of read image data resulting from reading the image;
- a setting step of setting inspection target areas in the inspection target image data; and
- an extracting step of performing an image processing for extracting the unique portion of the inspection target areas set by the setting step,
- wherein the setting step sets the inspection target areas so as to make a ratio of a range occupied by inspection target areas to an entire image area of the inspection target image data in a direction intersecting with the predetermined direction larger than a ratio of a range occupied by inspection target areas to the entire image area in the predetermined direction.

* * * * *